United States Patent [19]
Hashimoto et al.

[11] Patent Number: 5,155,718
[45] Date of Patent: Oct. 13, 1992

[54] OPTICAL RECORD MEDIUM READING APPARATUS HAVING A DE-FOCUSSED LIGHT BEAM PROJECTED ON AN OPTICAL RECORD MEDIUM

[75] Inventors: Akihiko Hashimoto; Hiroyuki Hagita; Koji Maruyama, all of Hachioji; Satoru Kato, Fukui, all of Japan

[73] Assignee: Olympus Optical Co., Ltd., Japan

[21] Appl. No.: 299,530

[22] Filed: Jan. 23, 1989

[30] Foreign Application Priority Data

| Jan. 25, 1988 | [JP] | Japan | 63-12489 |
| Feb. 29, 1988 | [JP] | Japan | 63-46028 |
| Mar. 10, 1988 | [JP] | Japan | 63-54750 |
| May 19, 1988 | [JP] | Japan | 63-120456 |

[51] Int. Cl.$^5$ ............................................. G11B 7/09
[52] U.S. Cl. ........................... 369/44.320; 235/456; 369/44.35; 369/44.42; 369/116; 369/118
[58] Field of Search ........................ 235/454, 456; 369/44.25, 44.26, 44.29, 44.32, 44.35, 44.36, 44.41, 44.42, 54, 58, 106, 109, 112, 116, 118, 120, 121; 346/76 L

[56] References Cited

U.S. PATENT DOCUMENTS

| 4,346,471 | 8/1982  | Hirasawa et al.   | 369/44.35 X |
| 4,635,244 | 1/1987  | Gotoh             | 369/112     |
| 4,661,942 | 4/1987  | Yoshimoto et al.  | 369/44.26 X |
| 4,761,775 | 8/1988  | Murakami          | 369/44.26   |
| 4,805,162 | 2/1989  | Stahl et al.      | 369/44.42 X |
| 4,918,415 | 4/1990  | Hashimoto et al.  | 235/454     |
| 4,918,675 | 4/1990  | Lee               | 369/112 X   |
| 4,965,785 | 10/1990 | Tadokoro et al.   | 369/112     |

FOREIGN PATENT DOCUMENTS

| 56-83849   | 7/1981  | Japan . |
| 61-153834  | 7/1986  | Japan . |
| 62-279523  | 12/1987 | Japan . |

*Primary Examiner*—Wayne R. Young
*Attorney, Agent, or Firm*—Parkhurst, Wendel & Rossi

[57] ABSTRACT

An apparatus for reading information out of an optical record medium including a semiconductor laser diode for emitting a laser beam, a collimator lens, a beam splitter, an objective lens, converging lens and a photodetector. The laser beam emitted from the laser diode is made incident upon the optical record medium via the collimator lens, beam splitter and objective lens, and a light flux reflected by the optical record medium is made incident upon the photodetector via the objective lens, beam splitter and converging lens. The laser diode and collimator lens are arranged such that the laser beam is projected upon the optical record medium in a de-focused condition, while the objective lens is in-focused on the optical record medium.

11 Claims, 20 Drawing Sheets

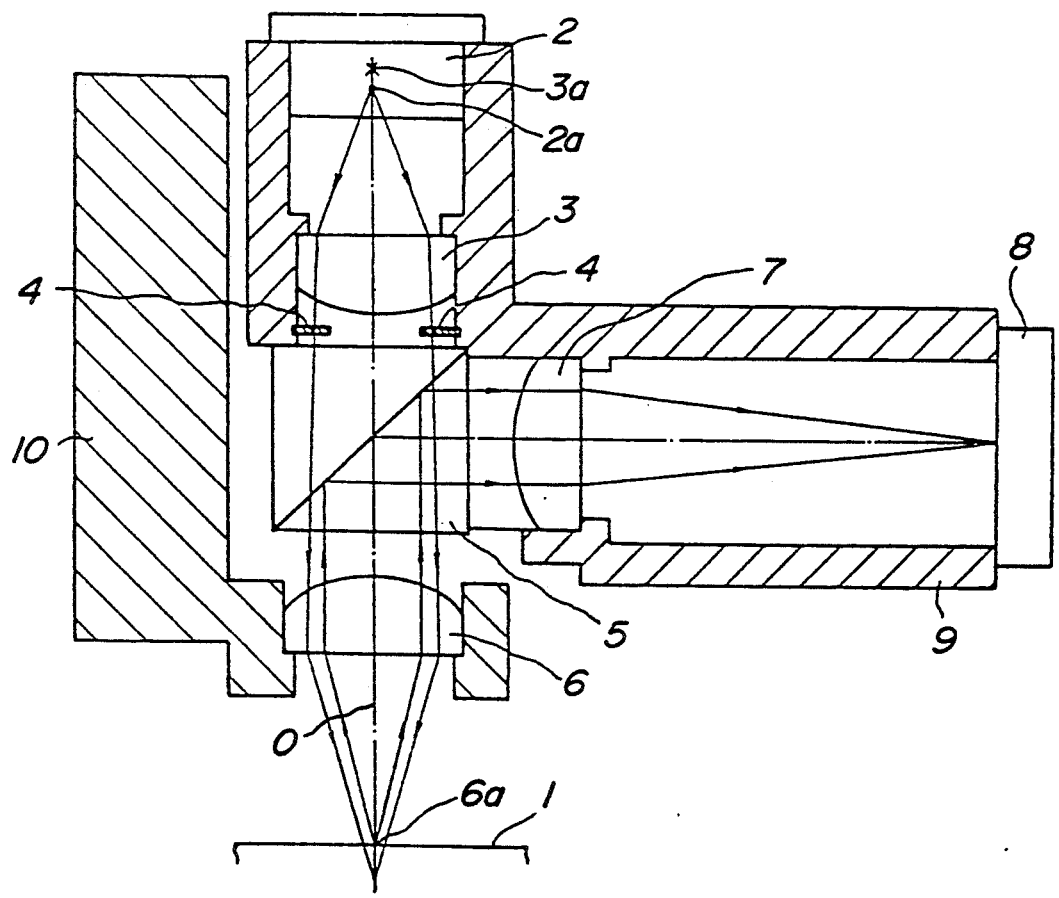
FIG_1

FIG._2
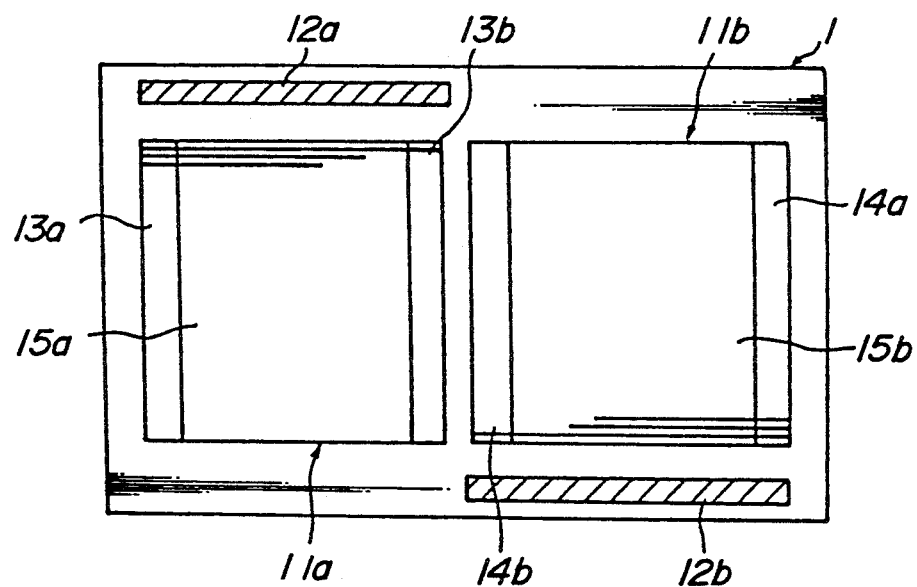

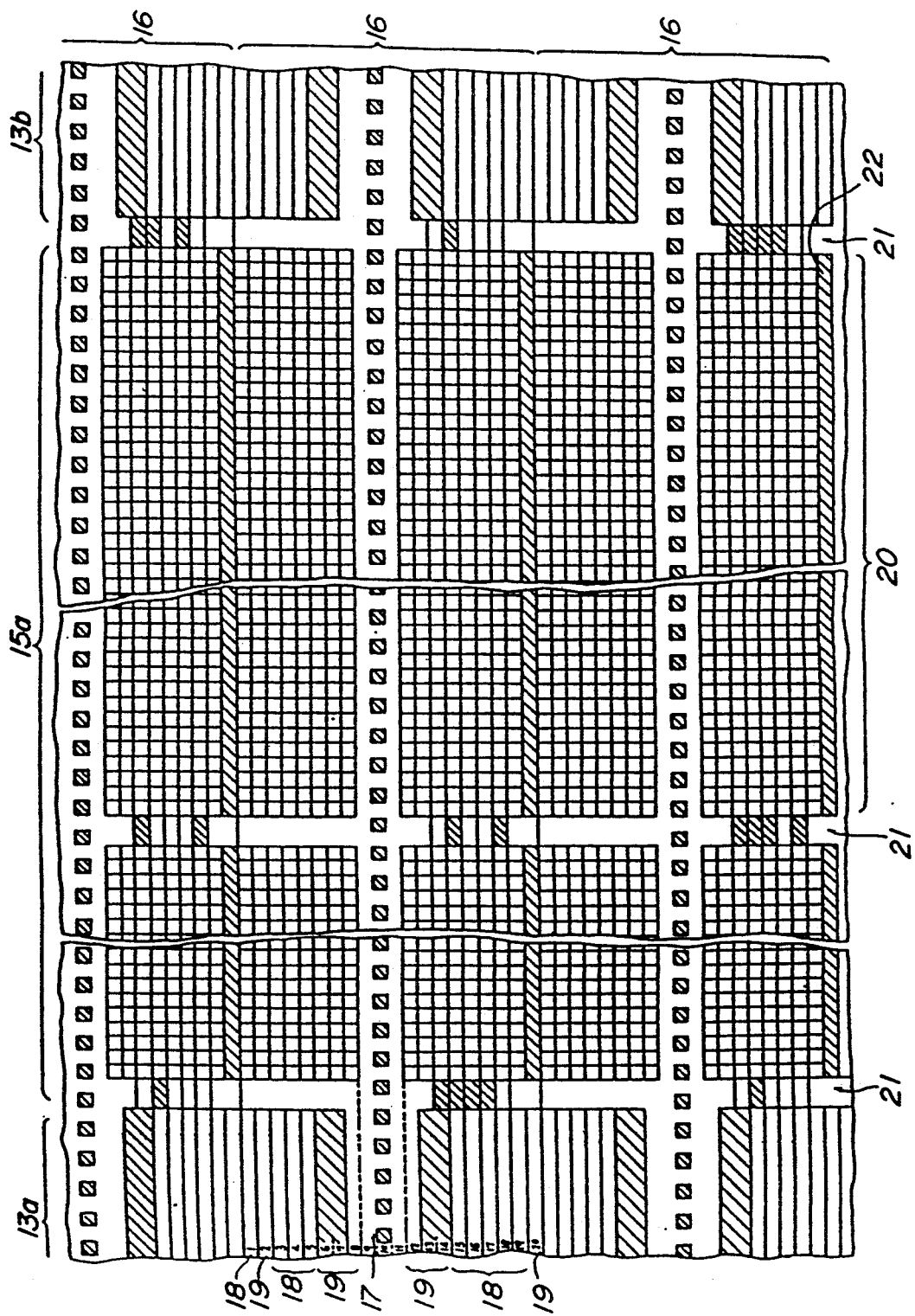

FIG._4
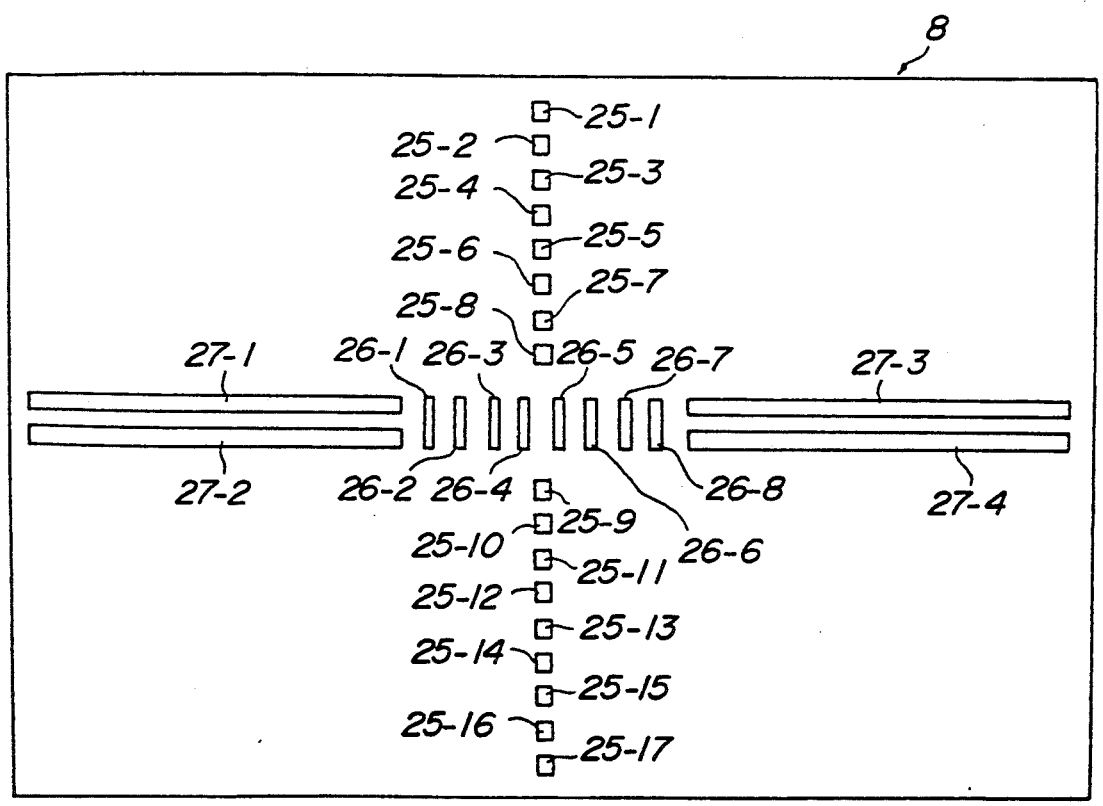

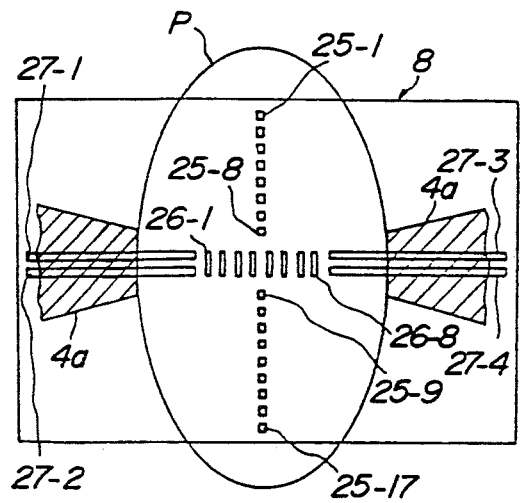
FIG_5A
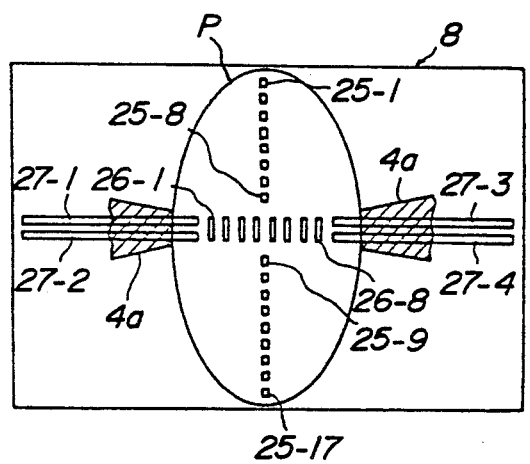
FIG_5B
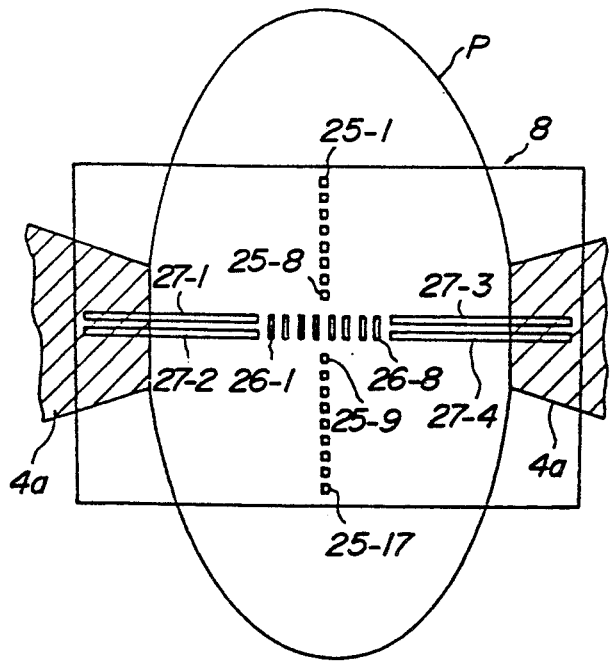
FIG_5C

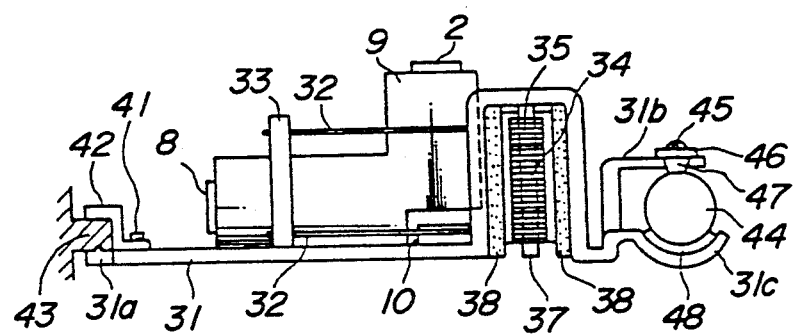
FIG_6A
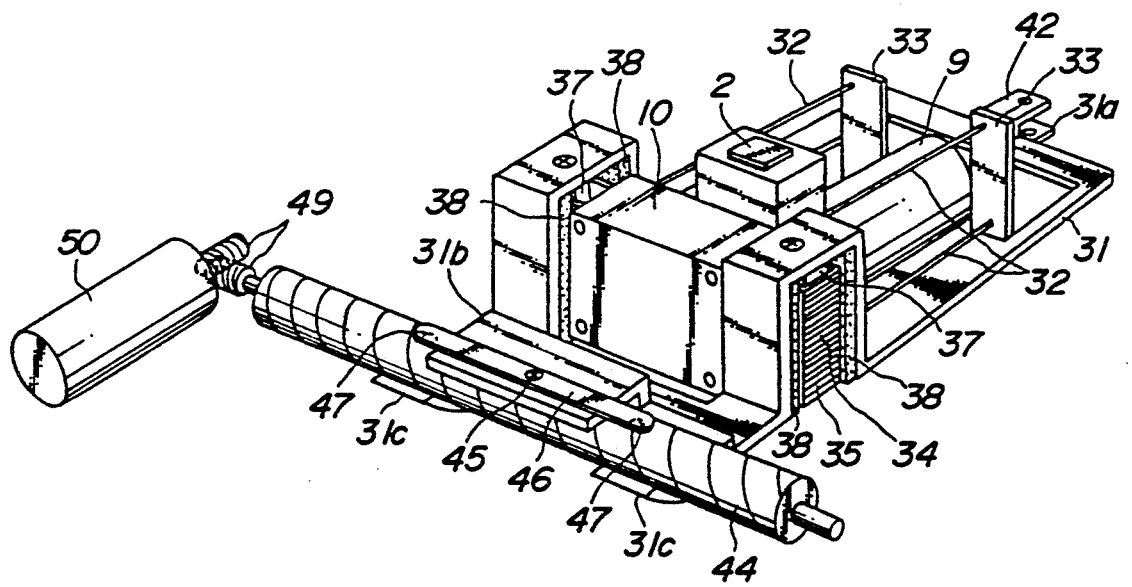
FIG_6B

FIG_7
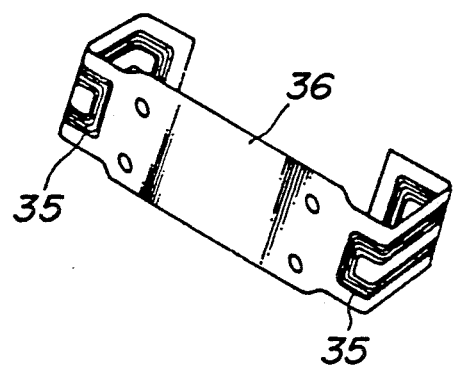
FIG_8
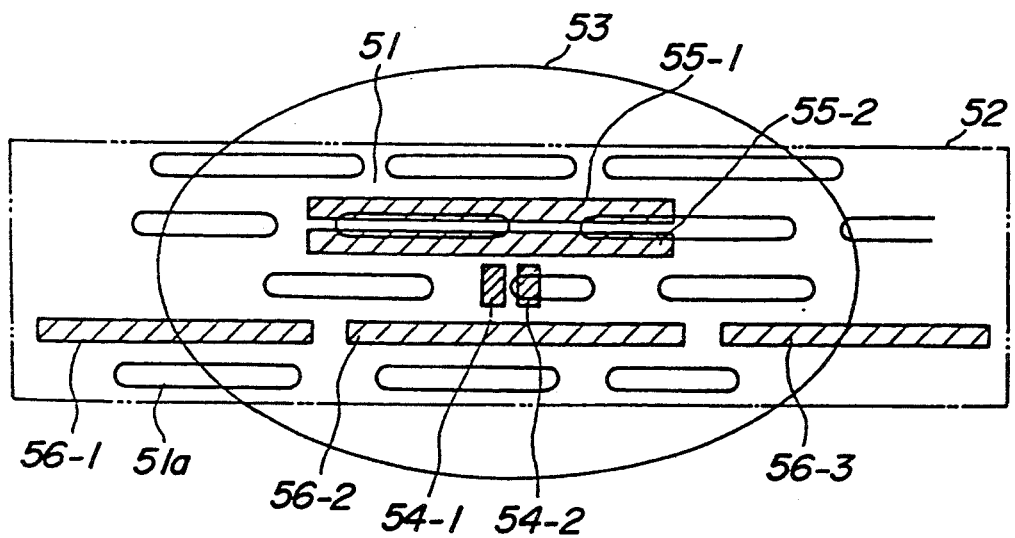

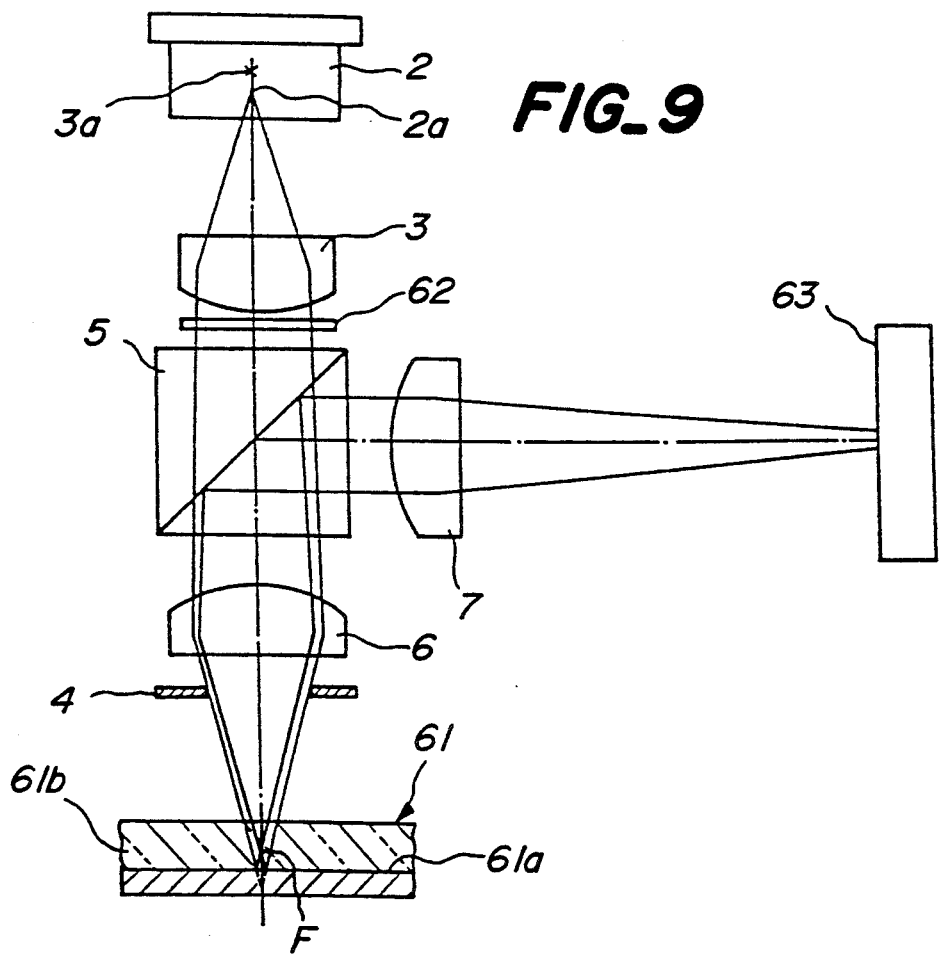
FIG_9
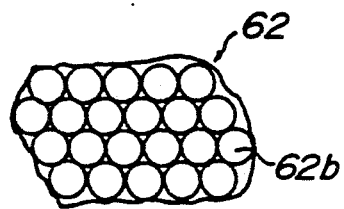
FIG_10A
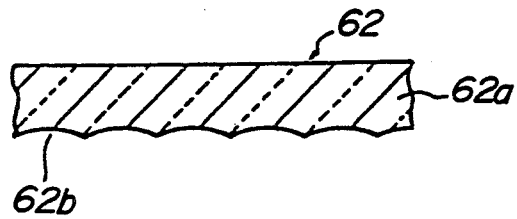
FIG_10B

FIG_11A
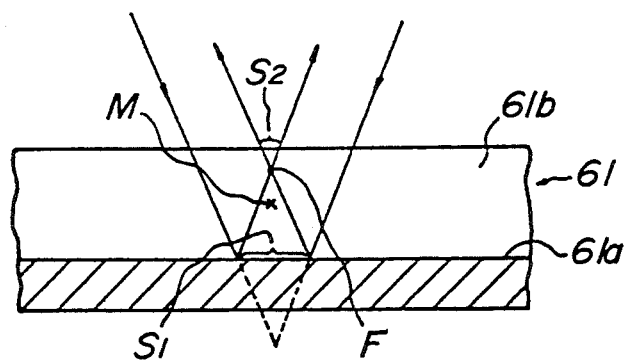
FIG_11B
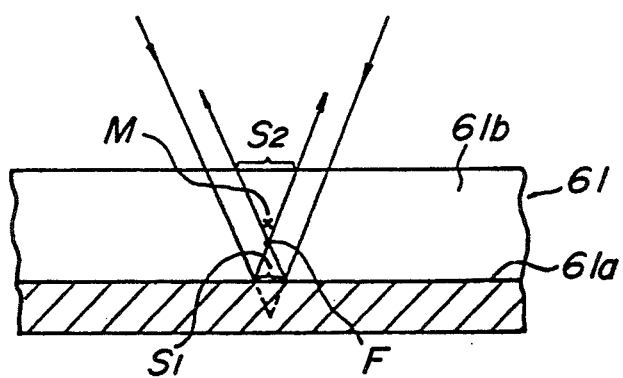

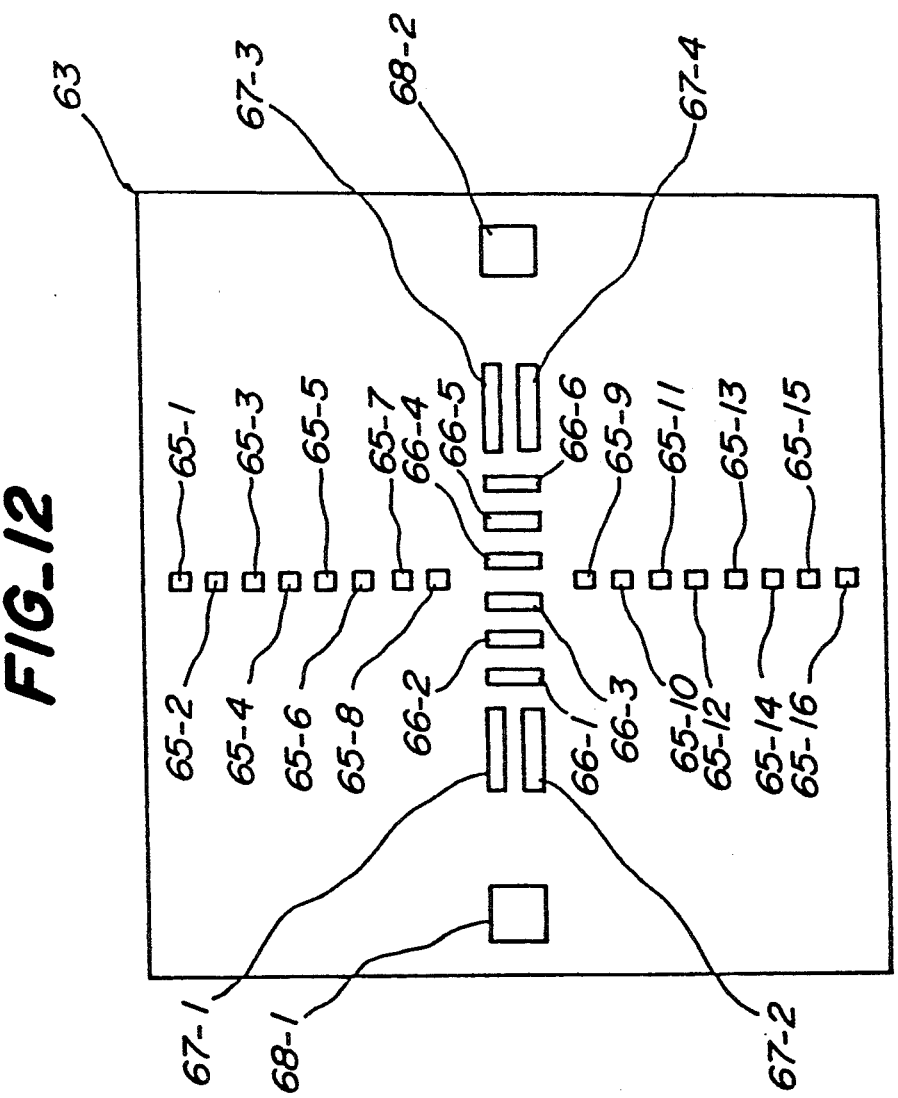

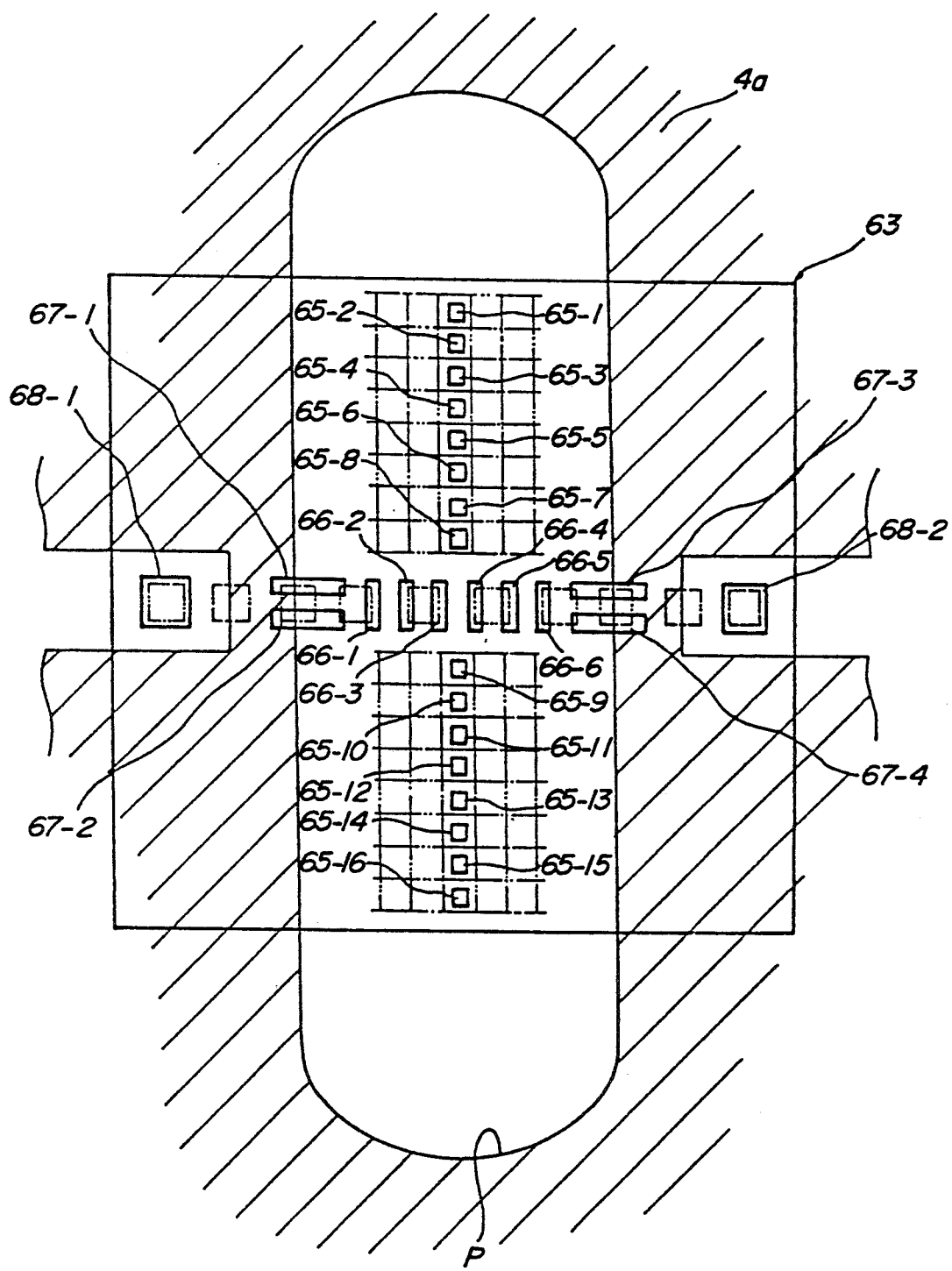
FIG_13

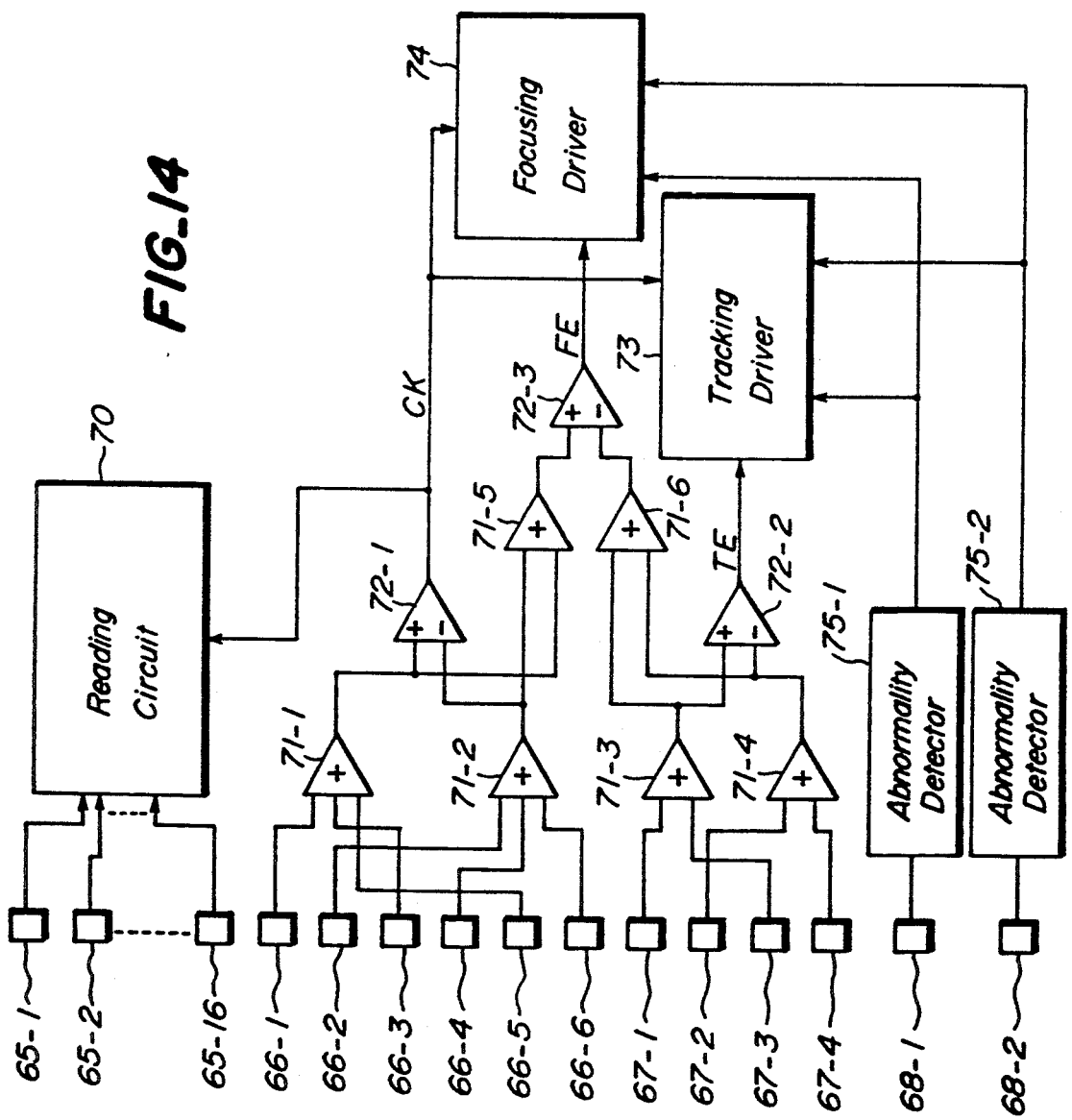

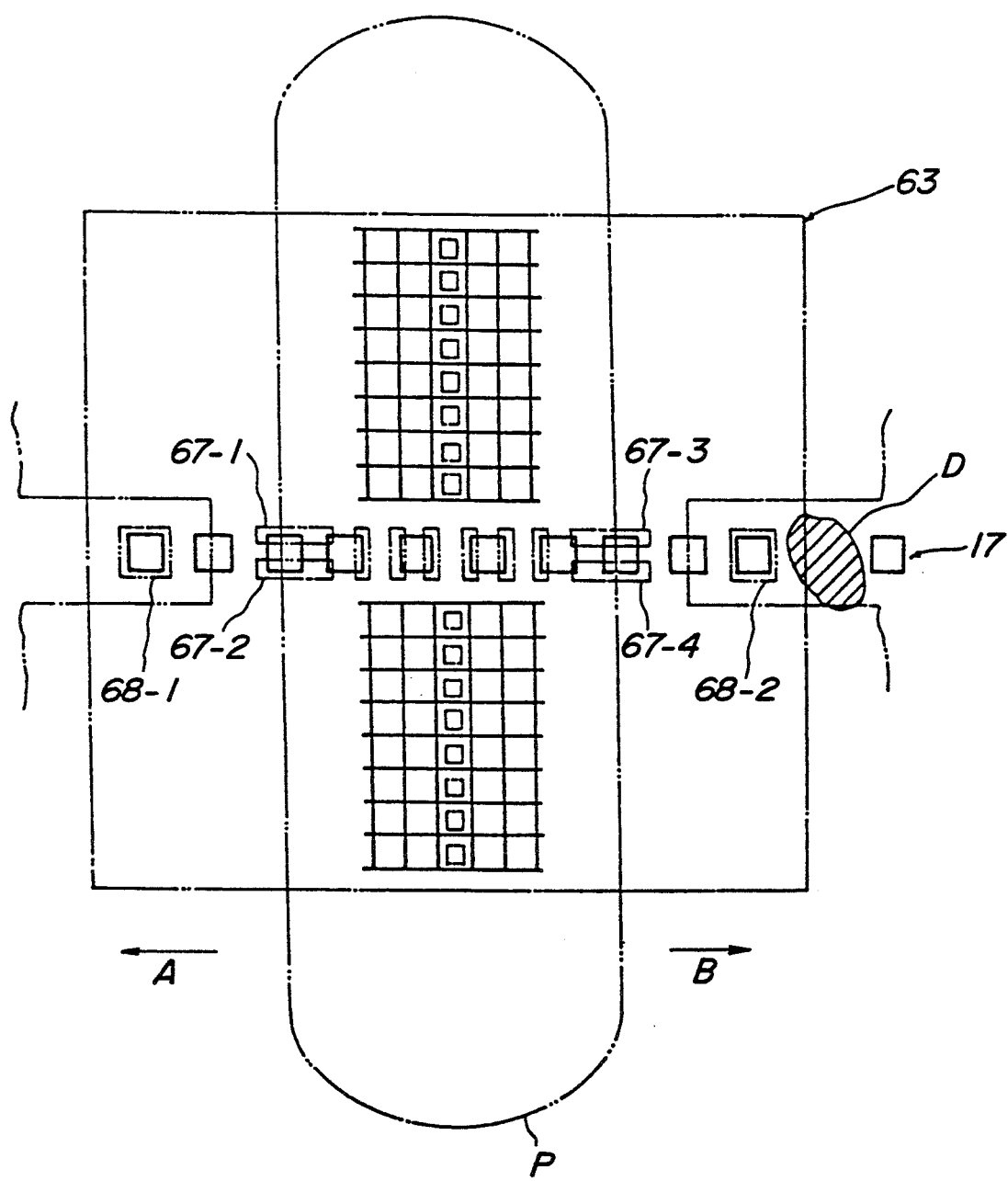

FIG_18A
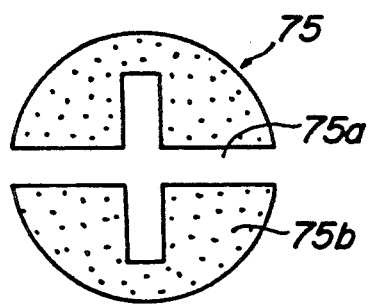
FIG_18B
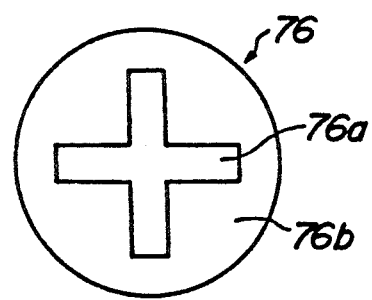
FIG_18C
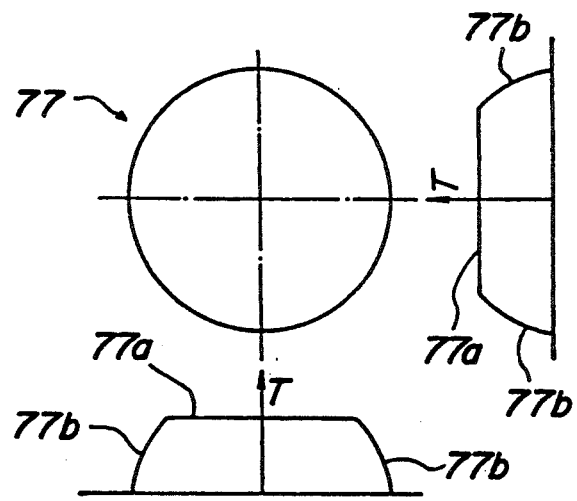

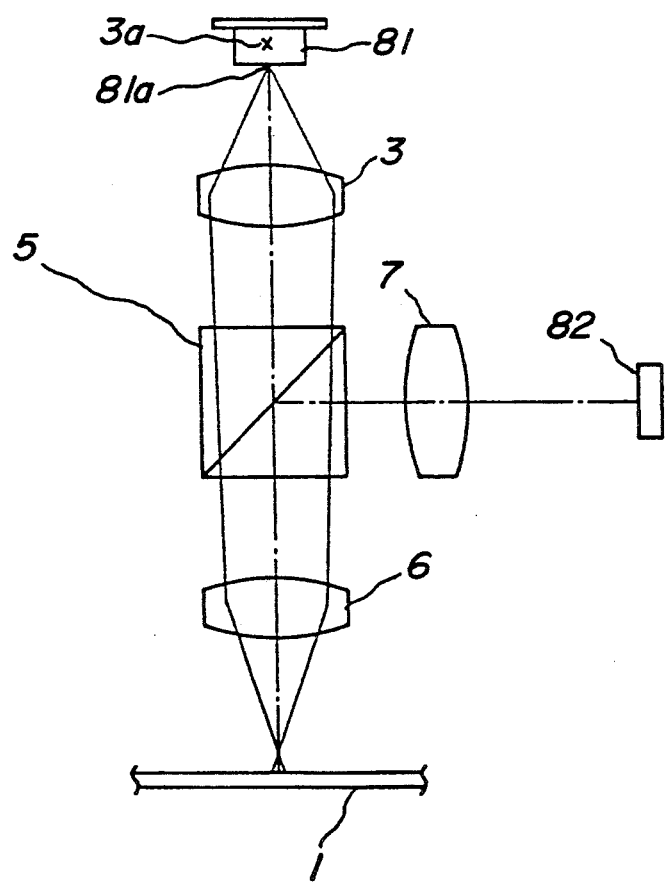
FIG_19

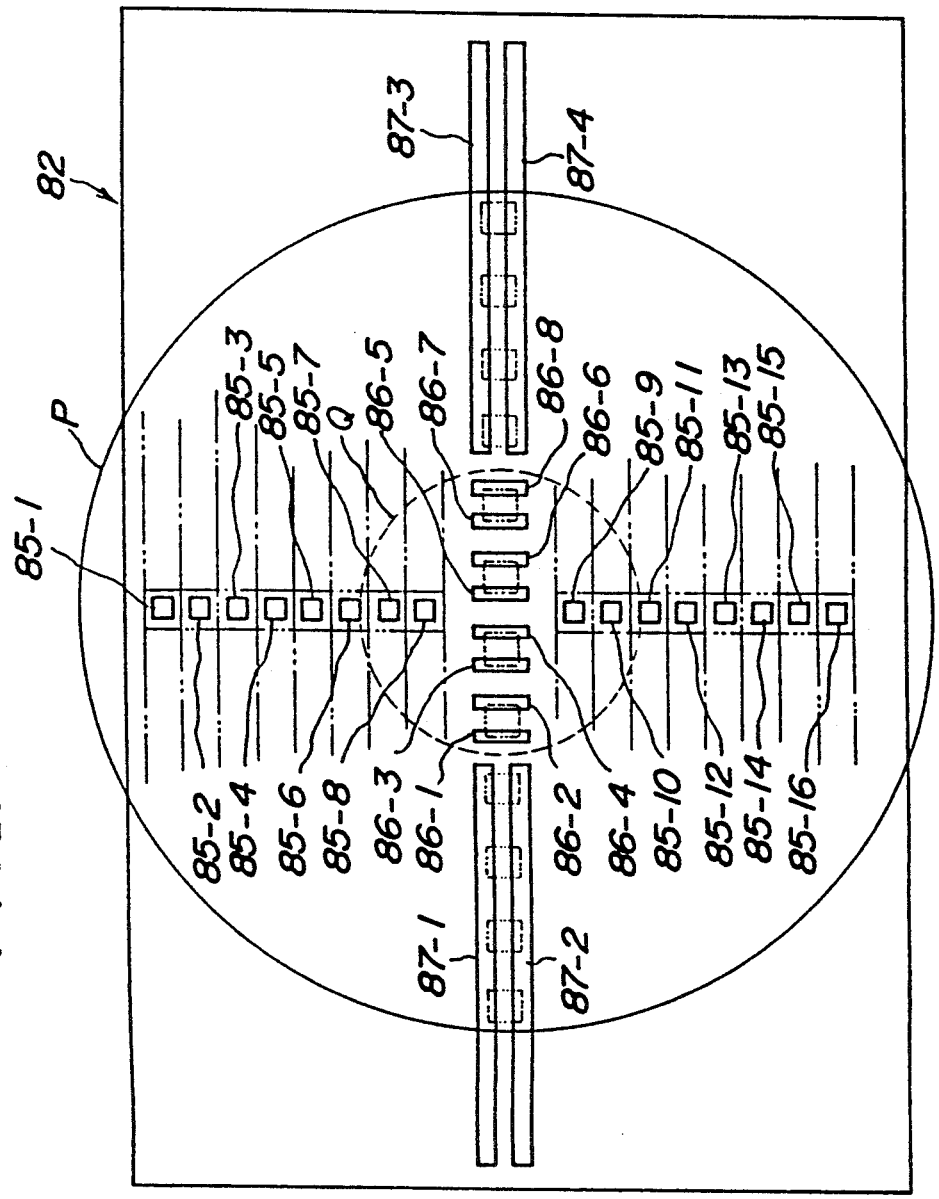

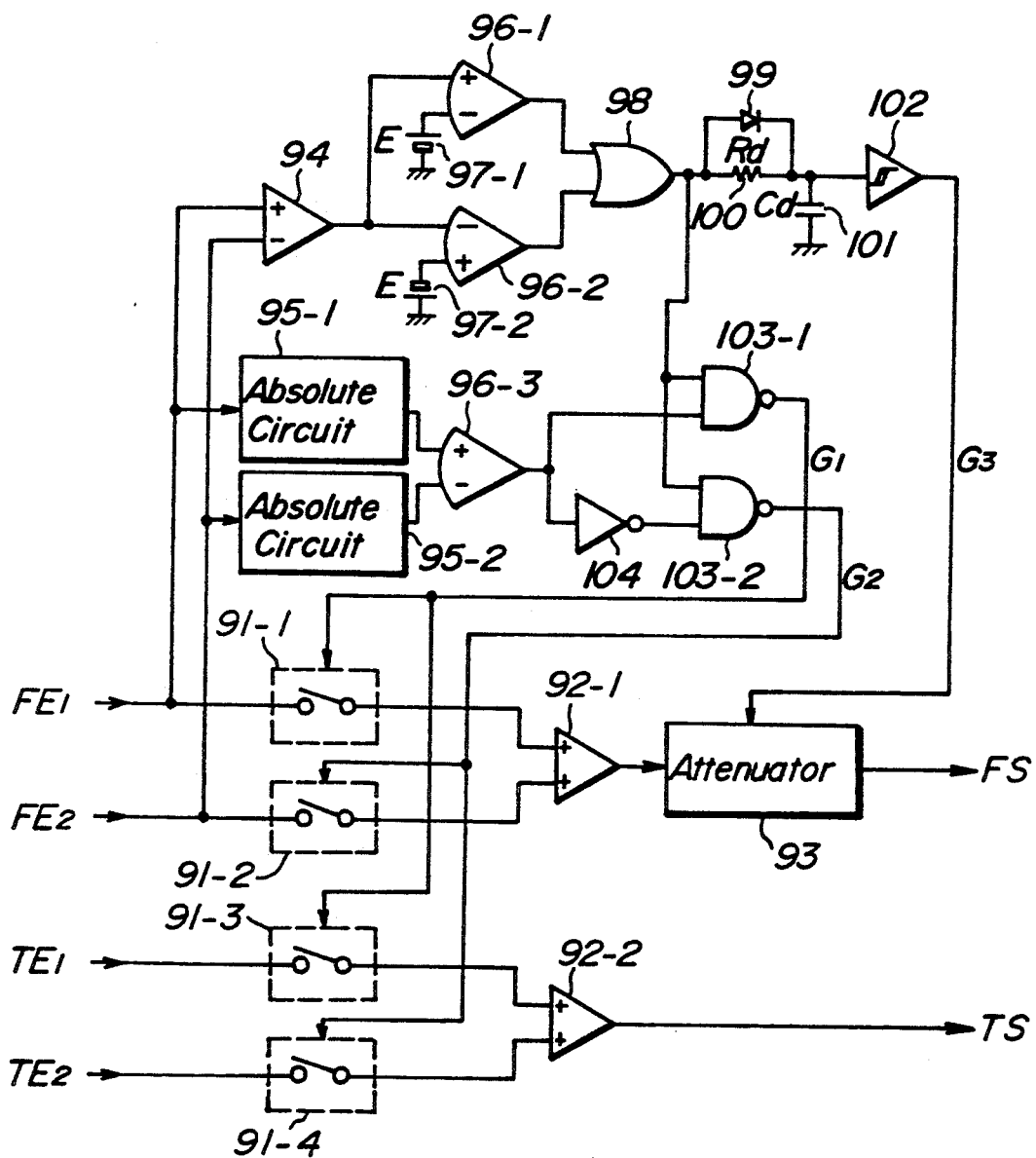
FIG_21

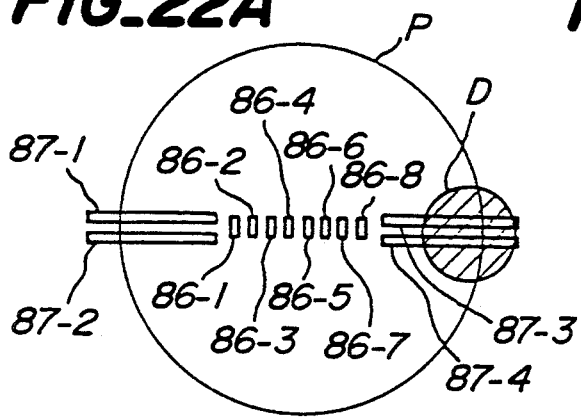
FIG._22A
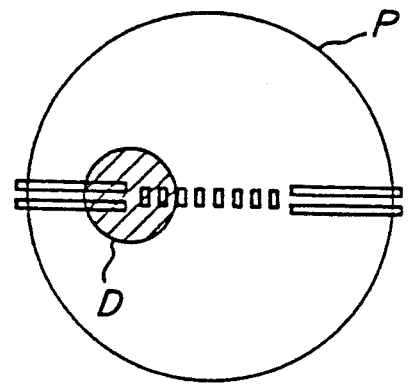
FIG._22D
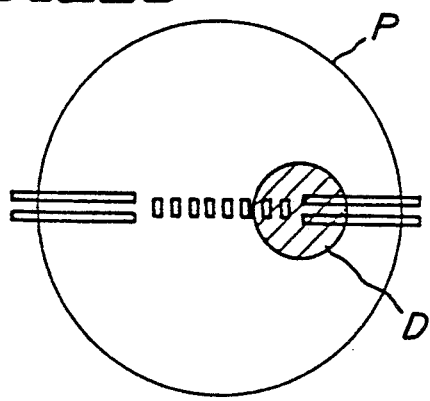
FIG._22B
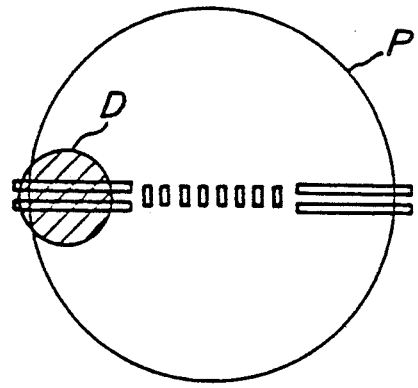
FIG._22E
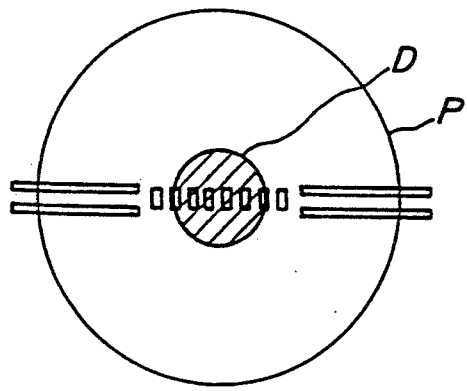
FIG._22C

FIG_23
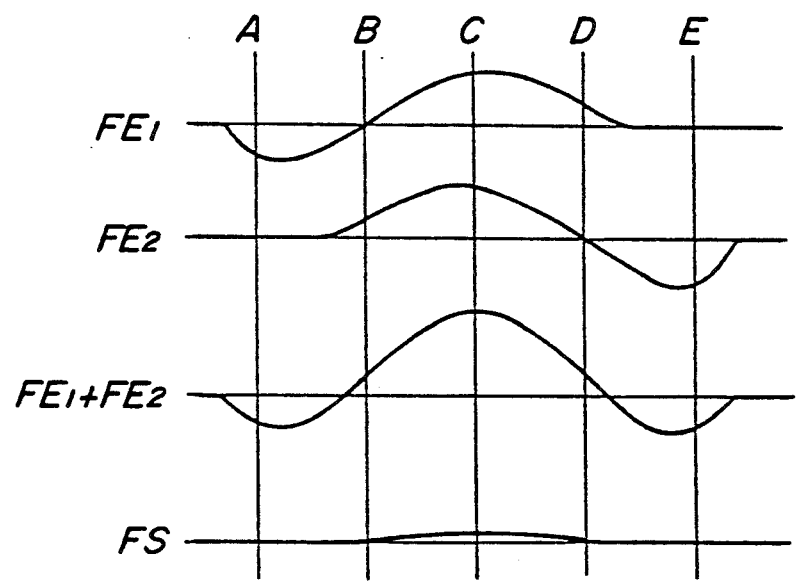
FIG_24
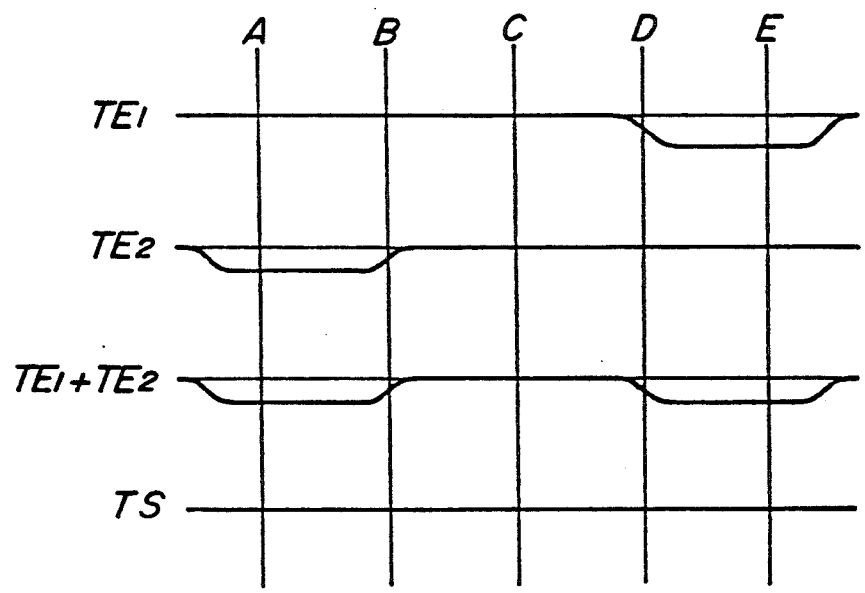

OPTICAL RECORD MEDIUM READING APPARATUS HAVING A DE-FOCUSSED LIGHT BEAM PROJECTED ON AN OPTICAL RECORD MEDIUM

BACKGROUND OF THE INVENTION

Field of the Invention and Related Art Statement

The present invention relates to an apparatus for reading information out of an optical record medium such as an optical card, compact disc, video disc or data disc.

There have been proposed various apparatuses for reading the information out of the optical record medium. For instance, in Japanese Patent Publication Kokai No. 56-83,849, there is disclosed an apparatus for reading information out of an optical record disc comprising a light source for emitting a light beam, a collimator lens for converting the light beam emitted from the light source into a parallel light beam, a beam splitter for splitting the parallel light beam, an objective lens for projecting a light beam emanating from the beam splitter upon an optical record disc and collecting and guiding a light flux reflected by the optical record disc into the beam splitter, a converging lens for converging a light beam emanating from the beam splitter and a photodetector for receiving the converge light beam to generate an electric signal representing the information stored in the optical record disc.

In the above mentioned known optical reading apparatus, the light source is arranged at a focal point of the collimator lens so that the light beam emitted by the light source is converted into the parallel light beam, and the parallel light beam is focused by the objective lens onto the optical record disc. In this known optical reading apparatus, the focused spot of the light beam is made incident upon the optical record disc, it is possible to read the information track having a very small width. By processing the electric signal supplied from the photodetector, the information signal as well as tracking and focusing error signals is derived by means of which the reading light beam can follow the data track and is focused on the record disc. In order to derive the focusing error, there is provided a special optical element such as a cylindrical lens for introducing astigmatism and a prism having a reflection surface set at a critical angle with respect to an incident light flux. In the reading apparatus for the optical card, it is desirable to make the apparatus as compact as possible, requiring deletion of the special optical element. In such a case, the focusing error has to be detected by any other a different means. In Japanese Patent Publication Kokai Sho 61-153,834, described an apparatus for reading information out of an optical card. In this known apparatus, it is necessary to read simultaneously three tracks, i.e. data track, control or clock track and guide track. To this end, three beams are used each of which is made incident upon respective tracks by means of a common objective lens. Further, in order to derive the focusing error, the light beams are made incident upon the optical card from an inclined direction. However, this known apparatus has a drawback that the optical system becomes very complicated and critical due to the fact that the three light beams have to be made incident on the optical card.

Japanese Patent Publication Kokai Sho 62-279,523 described another known apparatus for reading information from the optical card. In this known apparatus, the optical card has a track construction such that a single data track comprises twenty four data lines and one control line, the twenty five lines have to be read out simultaneously. Therefore, the use of the technique disclosed in the Japanese Patent Publication Kokai Sho 61-153,834 requires twenty five light beams. However, it is practically impossible to generates such a large number of light beams. In the Japanese Patent Publication Kokai Sho 62-279,523, a light beam emitted from a light source, e.g. laser diode, is projected upon the optical card by means of an illumination lens as a light spot having a diameter sufficiently larger than a width of the data unit, and a light flux reflected by the optical card is collected by an objective lens. The illumination lens and objective lens are arranged such that their optical axes form a V-shaped configuration viewed from a direction perpendicular to an incident plane. The focusing error can be detected without providing the special optical element. However, this known apparatus has a drawback that the illuminating lens makes the cost and size of the apparatus higher and larger, respectively.

In the above mentioned known optical information reading apparatus disclosed in the Japanese Patent Publication Kokai Sho 62-279,523, the control line is formed by an array of square blocks arranged equidistantly. By detecting this array of blocks, there can be detected a control signal by means of which there is generated the clock signal as well as the focusing and tracking error signals. Therefore, in the case of one or more blocks formed incorrectly or having defects, it is not therefore possible to derive the control signal correctly, therefore producing large focusing and tracking deviations, and the information can not be read out correctly.

SUMMARY OF THE INVENTION

The present invention has for its object to provide a novel and useful apparatus for reading information out of an optical record medium, which apparatus can be constructed in a simple and compact construction, while the information can be read out accurately.

It is another object of the invention to provide an apparatus for reading information out of an optical record medium, in which the information can be always read out accurately even if a control line has a defect.

According to the invention, an apparatus for reading information out of an optical record medium including a light source for emitting a light beam, a collimator lens for collimating the light beam emitted from the light source into a collimated light beam, a beam splitter for guiding said collimated beam into a first direction, an objective lens for projecting the collimated light beam onto the optical record medium and for guiding a light flux reflected by the optical record medium into the beam splitter, a converging lens for converging the light flux emanating from the beam splitter into a second direction which is different from said first direction, and a photodetector for receiving the light flux emanating from the converging lens to derive a signal representing the information recorded on the optical record medium, the improvement being characterized in that said light source is arranged to be deviated from a focal point of said collimator lens such that the optical record medium is illuminated in a de-focused condition.

BRIEF DESCRIPTION OF THE DRAWINGS

FIG. 1 is a schematic view showing the construction of an embodiment of the optical reading apparatus according to the invention;

FIG. 2 is a plan view illustrating the construction of the optical card;

FIG. 3 is a plan view depicting the track construction of the optical card;

FIG. 4 is a schematic plan view representing the construction of the photodetector shown in FIG. 1;

FIGS. 5A, 5B and 5C are schematic views illustrating the positional relationship between the photodetector and the image of optical card;

FIGS. 6A and 6B are side and perspective views, respectively showing the whole construction of the optical pick-up apparatus;

FIG. 7 is a perspective view depicting the construction of the tracking coil shown in FIGS. 6A and 6B;

FIG. 8 is a schematic view showing another embodiment of the photodetector;

FIG. 9 is a schematic view illustrating the construction of another embodiment of the optical reading apparatus according to the invention;

FIGS. 10A and 10B are plan and cross sectional views, respectively of the diffusion plate shown in FIG. 9;

FIGS. 11A and 11B are cross sectional views explaining the function of the embodiment shown in FIG. 9;

FIG. 12 is a schematic plan view illustrating the photodetector shown in FIG. 9;

FIG. 13 is a schematic view showing the positional relationship between the photodetector and the image of the optical card;

FIG. 14 is a circuit diagram showing the signal processing circuit according to the invention;

FIG. 15 is a schematic view explaining the operation of detecting a defect;

FIGS. 18A, 18B and 18C illustrating several embodiments of the, diffusion plate;

FIG. 19 is a schematic view showing still another embodiment of the optical reading apparatus according to the invention;

FIG. 20 is a schematic view illustrating the photodetector shown in FIG. 19;

FIG. 21 is a circuit diagram of the signal processing circuit;

FIGS. 22A~22E are schematic views explaining the operation of the circuit shown in FIG. 21; and FIGS. 23 and 24 are graphs representing various signals appearing at various points of the circuit shown in FIG. 21 at various timings.

DESCRIPTION OF THE PREFERRED EMBODIMENTS

Figure 16A:
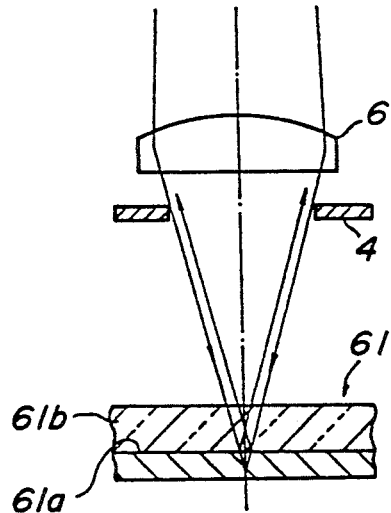
FIGS. 16A, 16B and 16C are cross sectional views showing the manner of detecting the focusing error.

FIG. 1 is a cross sectional view showing the construction of the optical system of an embodiment of the optical information reading apparatus according to the invention. In the present embodiment, the optical record medium is formed by an optical card 1. The apparatus comprises semiconductor laser diode 2, collimator lens 3, stop 4, beam splitter 5, objective lens 6, converging lens 7 and photodetector 8. The semiconductor laser diode 2, collimator lens 3, stop 4, beam splitter 5, converging lens 7 and photodetector 8 are secured to a lens holder 9 which is fixed to a base member of an optical pick-up as will be explained later. The objective lens 6 is secured to a holder 10 which is supported by the base member movably both in a direction parallel to an optical axis 0 of the objective lens 6 and in a tracking direction which is perpendicular to a direction of tracks formed on the optical card 1. The light beam emitted from the semiconductor laser diode 2 is made incident upon the optical card 1 as a reading light beam by means of the collimator lens 3, stop 4, beam splitter 5 and objective lens 6, and a light flux reflected by the optical card 1 is made incident upon the photodetector 8 via the objective lens 6, beam splitter 5 and converging lens 7. The reading light beam is projected onto the optical card 1 perpendicularly to the optical card.

FIG. 2 is a schematic plan view showing an embodiment of the optical card 1. In the present embodiment, the optical card 1 includes two record areas 11a and 11b which are aligned in the longitudinal direction of the optical card. In case of using the optical card, the card is inserted into the card reader from right or left side. The optical card 1 further comprises two position detecting marks 12a, and 12b each corresponding to respective record areas 11a and 11b. In each record areas 11a, 11b, there are formed a number of data tracks, said tracks extending in the direction in which the card is inserted into the card reader. At respective ends of the tracks there are formed seek portions 13a, 13b and 14a, 14b in which track numbers are recorded, so that data areas 15a, 15b are provided between the seek portions.

FIG. 3 is a schematic plan view showing the construction of the track 16 in the record region 11a. The track 16 includes twenty lines which are arranged in parallel with each other in the longitudinal direction of the card and are separated from each other by a constant distance. In a tenth line counted from, the uppermost line, a clock pattern 17 is formed which extends throughout the seek portion 13a, data portion 15a and seek portion 13b. The clock pattern 17 is consists of an array of square black blocks arranged equidistantly. By reproducing the clock pattern 17 it is possible to effect the generation of clock pulses and the detection of the focusing and tracking errors. Lines Nos. 1, 3~5 and 15~19 in the seek areas 13a, 13b constitute a track number portion 18 in which a track number pattern representing a track number of a relevant track is recorded. Line Nos. 2, 6~8, 12~14 and 20 constitute a track number pattern identifying portion 19 in which an identification pattern for identifying the track number pattern is recorded. The track number identification pattern is common for all tracks. In the present embodiment, the track number identifying pattern 19 is formed by the lines Nos. 2, 8, 12 and 10 made of white liens (corresponding to "1" of binary data) and the lines Nos. 6, 7, 13 and 14 made of black lines (corresponding to "0" of binary data). When the identifying pattern is detected, the track number written in the track number portion 18 is read out. It should be noted that the track number identifying pattern is existent in a single track and could never be found over two adjacent tracks.

In the data portion 15a, a plurality of frames 20 are provided in each single track 16, and frame numbers 21 for identifying respective frames are recorded between successive frames 20 as well as between the seek portions 13a, 13b and the frames 20. In each frame, there a frame synchronizing line 22 in the last line No. 20 is provided so as to derive a frame synchronous signal. In the data portions 13a, data signals of two bytes, each being composed of eight bits, are recorded in upper eight lines Nos. 1~8 and lower eight lines Nos. 12~19. these two byte data signals are read out simultaneously in synchronism with the black clock pattern 17. The other record area 13b has the same track construction as that just explained above.

In the present embodiment, the seek portion 13a and 13b are read out by moving the optical pick-up in the direction perpendicular to the track direction of the optical card 1 to find a desired track. After the desired track has been found, the information stored in the data portion 15a is read out by moving the optical card 1 in the track direction.

FIG. 4 is a plan view illustrating an embodiment of the photodetector 8 shown in FIG. 1 for reading the information from the optical card 1 having the track formation illustrated in FIG. 3. The photodetector 8 includes eighteen light receiving elements 25-1-25-17 aligned in the width direction of the track, each of said light receiving elements being corresponded to respective data track lines Nos. 1~8 and 12~20. The photodetector 8 further comprises four pairs of clock generating light receiving elements 26-1~26-8 which are arranged to be symmetrical with respect to the line along which the light receiving elements 25-1~25-17 are arranged, and two pairs of focusing and tracking light receiving elements 27-1~27-4 which are arranged also to be symmetrical with respect to the line along which the elements 25-1~25-17 are aligned and are separated from each other in the direction of track width. Each of light receiving elements 27-1~27-4 is extended in the track direction such that it receives images of a plurality of clock blocks.

During the seek operation, the optical pick-up is moved in the direction of track width above one of the seek portions 13a, 13b, 14a and 14b, while output signals from the light receiving elements 25-1~25-17 are detected. When the light receiving elements 25-2, 25-6~25-11 and 25-17 simultaneously detect the black block images, it is certified that the track number identification pattern is detected. Then, a track number is detected by processing the output signals from the light receiving elements 25-1, 25-3~25-5, 25-12~25-15 and 25-16. As explained above, only one track number identification pattern is existent in each track 16 and could not be found over two tracks, so that the track number can be read out positively and accurately.

When the data stored in the data area 15a, 15b is to be read out, the optical card 1 is moved in the track direction. During this movement, a clock signal is derived from a difference between a sum of output signals from the light receiving elements 26-1, 26-3, 26-5 and 26-7 and a sum of output signals from the light receiving elements 26-2, 26-4, 26-6 and 26-8. In synchronism with the thus derived clock signal, a tracking error signal is derived from a difference between a sum of output signals from the light receiving elements 27-1, 27-3 and a sum of output signals from the light receiving elements 27-2, 27-4. By means of the thus derived tracking error signal, the tracking servo control is effected such that the reading light spot follows the track correctly. Also in synchronism with the clock signal, a focusing error signal is derived from a difference between a sum of output signals from the light receiving elements 26-1~26-8 and a sum of output signals from the light receiving elements 27-1~27-4. With the aid of the thus derived focusing error signal, the focus servo control is carried out to move the objective lens 6 in the optical axis direction such that the focal point 6a of the objective lens 6 is always remained on the optical card 1. Under the control of the frame synchronizing signal derived from the output signal of the light receiving element 25-17, the data is recovered from the output signals of the light receiving elements 25-1~25-16.

In the present embodiment, the semiconductor laser diode 2 is secured to the lens holder 9 such that a longer axis of an elliptical cross section of the laser beam emitted from the laser diode is aligned in the direction of the track width on the optical card 1, and a light emitting point 2a of the semiconductor laser diode 2 is situated toward the collimator lens 3 with respect to the focal point 3a of the collimator lens 3. The stop 4 is secured to the lens holder 9 that the stop partially shields corresponding to the light receiving elements 27-1, 27-2 and 27-3, 27-4 viewed in a shorter axis of the elliptical cross section of the laser beam. Then, the light beam emanating from the collimator lens 3 diverges to a small extent and is focused by the objective lens 6 at a position which is far from the objective lens with respect to a focal point 6a of objective lens 6. That is to say, according to the invention, the reading light beam is projected onto the optical card 1 in the de-focused condition and an area of the light spot on the card is sufficiently wide for illuminating a single track viewed in the width direction of the track.

FIGS. 5A, 5B and 5C show the condition of the spot image received by the photodetector 8 at various focus conditions. In these figures elliptical loci P represent portions which have the same luminance intensity as that at a front edges of light shielded portions 4a, 4a corresponding to the stop 4. FIG. 5A illustrates the in-focused condition in which the focal point 6a of the objective lens 6 is just situated on the optical card 1. When the optical card 1 is moved downward in FIG. 1 and the optical card 1 is situated away from the focal point 6a of the objective lens 6 (forward defocus), the illuminated area becomes smaller as shown in FIG. 5B. When the optical card 1 is moved upward in FIG. 1 (backward deforcus), the area illuminated with the reading light beam becomes larger as illustrated in FIG. 5C. Therefore, when it is set that the difference between the sum of output signals of elements 26-1~26-8 and the sum of output signals of elements 27-1~27-4 becomes zero under the in-focused condition shown in FIG. 5A, it is possible to derive the focusing error signal which has opposite polarities in the de-focused conditions depicted in FIGS. 5B and 5C. Therefore, the focusing servo control is effected such that the focusing error signal is kept zero, and the focused image of the optical card 1 can be always detected.

When the optical card 1 is moved downward in FIG. 1 to a great extent, the illuminated area becomes larger and the polarity of the focusing error signal is reversed, and then the objective lens 1 might be moved upward so that the focusing servo could not be conducted correctly. This can be removed by any suitable means. For instance, during the upward movement of the objective lens 6, when the focusing error signal denotes that the objective lens should be moved upward, the objective lens is forcedly moved downward until the polarity of the focusing error signal is reversed. In case that the objective lens 6 is driven by an analog signal which is obtained by converting a digital signal supplied from a signal processing circuit such as CPU, when the digital signal exceeds a predetermined threshold value, the objective lens 6 is forcedly moved until the polarity of the focusing error signal is inverted.

FIGS. 6A and 6B are side view and perspective views, respectively, showing the whole construction of the optical pick-up of the present embodiment. The lens holder 9, to which are secured the semiconductor laser diode 2, collimator lens 3, stop 4, beam splitter 5, converging lens 7 and photodetector 8, is fixed to a base 31 made of magnetic material. The holder 10 which holds the objective lens 6 is supported by means of four resilient wires 32 movably in the optical axis direction (focusing direction) of the objective lens 6 as well as in the direction (tracking direction) perpendicular both to the focusing direction and the track direction. The other ends of wires are secured to a supporting member 33 secured to the base 31. On a side wall of the holder 10, a focusing coil 34 is secured which serves to generate a force for moving the holder 10 in the focusing direction. On the focusing coil 34 are secured tracking coils 35, which generate a force for moving the holder 10 in the tracking direction. As shown in FIG. 7, the tracking coils 35 are formed by a print coil printed on a flexible substrate 36. On the flexible substrate 36 there are formed conductive lands for making the connection to the focusing coils 34 and conductive lands for connecting the ends of wires 32 which are also used as electric conductors for the focusing and tracking coils 34 and 35.

To the base 31 are further secured yokes 37 which are introduced into the focusing coils 34, and permanent magnets 38 are secured to the yokes 37 to produce magnetic fluxes which pass through the focusing and tracking coils 34 and 35. By supplying electric currents corresponding to the focusing and tracking errors to the focusing and tracking coils 34 and 35, respectively, there are produced forces at portions of focusing and tracking coils situated in the magnetic fluxes for moving the holder 10 in the focusing and tracking directions.

In order to seek a desired track by moving the base 31 in the track width direction, a projection 31a is formed in the base 31, and a leaf spring 42 is secured to the projection 31a by means of a pin 41. Between the projection 31a and the leaf spring 42 is clamped a guide member 43 which is extended in the track width direction, so that the base 31 can move along the guide member 43. At the other end of the base 31 there are provided projections 31b and 31c which project over and under a lead screw 44 arranged rotatably and extended in the track width direction. To the projection 31b is secured a leaf spring 47 with the aid of a screw 45, and pins 47 are fixed to the leaf spring 46 at its both ends such that tips of these pins are clamped in a groove of the lead screw 44. Between the projection 31a and the lead screw 44 is inserted a lubricant sheet 48 so that the base can be easily moved along the lead screw. The lead screw 44 is coupled with an output shaft of a motor 50 via worm gears 49. By driving the motor 50 to rotate the lead screw 44 in both directions, the optical pick-up can be moved reciprocally in the direction of the width of the tracks on the optical card 1.

In the above explained embodiment, the information is read out of the optical card, but the present invention may be equally applied to any optical record mediums other than the optical card by constructing the photodetector in accordance with the track construction.

In compact discs and video discs, the track is formed by a single array of pits as shown in FIG. 8. In this case, the reading light beam 53 emitted from the semiconductor laser diode and having the elliptical cross section is projected onto the optical disc in the de-focused condition such that the longer axis of the elliptical cross section is aligned in the track direction. A photodetector 52 comprises two light receiving elements 54-1, 54-2 for receiving an image of a track, two tracking light receiving elements 55-1, 55-2 which are extended in the track direction such that they receive images of opposite side edges of a track adjacent to the relevant track, and three focusing light receiving elements 56-1~56-3 which are aligned in the track direction between successive tracks. The information is read out by processing output signals from the light receiving elements 54-1, 54-2, the tracking error signal is derived from a difference between output signals of the light receiving elements 55-1 and 55-2. The focusing error signal is derived from a difference between a sum of output signals of light receiving elements 56-1 and 56-3 and the output signal of the light receiving element 56-2. In this manner, in case that the track is formed by a single array of pits, the focusing and tracking signals can always be derived stably, and therefore the information can be read out accurately.

In the above embodiment, the reading light beam emitted from the laser diode 2 is transmitted through the beam splitter 5 and the light reflected by the optical card 1 is reflected by the beam splitter toward the photodetector 8. However, the position of the semiconductor laser diode 2 and collimator lens 3 may be changed by the position of the converging lens 9 and photodetector 8. Then the reading light beam emitted by the laser diode 2 is reflected by the beam splitter 5 toward the optical card. The light reflected by the optical card is transmitted through the beam splitter toward the photodetector 8. Further, the beam splitter 5 may be formed by a polarizing beam splitter. The light may be used effectively, while the back talk of the laser beam reflected by the optical card onto the semiconductor laser diode can be efficiently prevented. Moreover, the stop 4 may be arranged at any position on the optical path, and as a case may be, the stop may be deleted. In the above embodiment, the light source is formed by the semiconductor laser diode which emits the laser beam having the elliptical cross section. It should be noted that the light beam having a circular cross section may also be used. In this case, the light beam emitted from the semiconductor laser diode may be shaped into the circular beam by means of a prism. Further, the light source may be formed by light emitting devices other than the semiconductor laser diode.

In the above embodiment, the reading light beam is defocused on the optical card 1 by providing the semiconductor laser diode 2 such that its light emitting point 2a is situated near the collimator lens 3 with respect to the focal point 3a thereof.

In general, the optical record medium is formed such that the record layer is covered with a transparent protection layer. Then, it has been found that even if the reading light beam is projected on the optical record medium such that a size of the beam spot formed on the record layer might be larger than a size of the beam spot formed by light reflected by the record layer on the surface of the transparent layer. Then, the light beam reflected by the record layer is influenced to a great extent by stains and debrises on the surface of transparent layer, and the information could not be read out accurately. According to another aspect of the invention, the above problem can be solved in a sophisticated manner which will be explained hereinafter.

FIG. 9 is a schematic view showing another embodiment of the optical reading apparatus according to the invention. In this embodiment, portions similar to those of the previous embodiment are denoted by the same reference numerals used in the previous embodiment. An optical card 61 includes a record layer 61a and a transparent layer 61b applied on the record layer. Between the collimator lens 3 and beam splitter 5 is arranged a diffusion plate 62, and the stop 4 is arranged below the objective lens 6. As shown in FIGS. 10A and 10B, the diffusion plate 62 is formed by a plane glass plate 62a having a number of concave spherical surfaces 62b formed in one surface thereof. By transmitting the laser light beam emitted from the light emitting point 2a of the semiconductor laser diode 2 through the diffusion plate 62, the light source may be considered to have a light emitting plane.

In the present embodiment, the optical card 61 has substantially the same track construction as that shown in FIG. 3, but the frame line 22 is deleted, so that each track comprises nineteen lines instead of twenty lines. When the width of a single line is set to 10 μm, the width of a single track 16 amounts to 190 μm, and when the width of a single line is designed to be 4 μm, the width of a single track is 76 μm.

Also in the present embodiment, the semiconductor laser diode 2 is arranged such that its light emitting point 2a is shifted with respect to the focal point 3a of the collimator lens 3, so that the reading light beam is projected on the optical card 61 in the de-focused condition. In this case, when the reading light beam is de-focused to such an extent that a focus point F of light rays reflected by the record layer 61a is situated above a middle point M of the transparent layer 61b as shown in FIG. 11A, a size of a spot $S_2$ formed on the surface of transparent layer 61b smaller than that of a spot $S_1$ formed on the record layer 61a. Then, the light flux emanating from the transparent layer 61b is liable to be influenced by stains or debris on the surface of transparent layer. Therefore, in the present embodiment, the de-focus amount is set such that the focus point F of the light rays reflected from the record layer 61a becomes lower than the middle point M of the transparent layer 61b as shown in FIG. 11B. Then, the spot $S_2$ formed on the surface of transparent layer 61b has a larger area than the spot $S_1$ on the record layer 61a, and therefore the information can be read out accurately without being influenced by the stains or debris on the surface of transparent layer 61b.

FIG. 12 is a plan view depicting the construction of a photodetector 63 in the present embodiment. The photodetector 63 comprises light receiving elements 65-1~65-16 aligned in the track width direction, each element corresponding to one of sixteen tracks. The photodetector 63 further comprises three pairs of light receiving elements 66-1~66-6 which are arranged symmetrically with the array of the elements 65-1~65-16 and are separated from each other by a distance corresponding to the distance of the blocks of the clock line 17 (see FIG. 3), and two parts of light receiving elements 67-1~67-4 which are arranged also symmetrically with respect to the array of elements 65-1~65-16, each of said elements 67-1~67-4 being extended in the track direction such that it receives a plurality of images of clock blocks simultaneously. In the present embodiment, in order to detect any defect of the clock pattern 17, a pair of light receiving elements 68-1~68-2 is arranged outside the elements 67-1~67-4. The size of these light receiving elements 68-1, 68-2 is set to an even multiple of a pitch of the clock pattern 17 so that they produce output signals having a given constant amplitude.

FIG. 13 illustrates the positional relationship between the image of the illuminated portion of the optical card 61 and the light receiving elements of the photodetector 63. The stop 4 is so formed that the shielded portion 4a is partially positioned on the light receiving elements 67-1~67-4 viewed in the direction of the short axis of the elliptical cross section of the light beams.

FIG. 14 is a circuit diagram showing an embodiment of the signal processing circuit for deriving the data signal and control signals such as the clock signal, focusing and tracking error signals, and track number signal.

During the seek operation, the optical pick-up is moved above the seek portion 13a, 13b, 14a, 14b in the direction of the width of the track on the optical card 61, and the output signals from the light receiving elements 65-1~65-16 are monitored by a reading circuit 70. When the reading circuit 70 detects the track number identification pattern, a track number is read out. The seek operation is ended when a desired track number has been detected. Then the optical card 61 is moved in the track direction to read out the data stored in the data area 15a, 15b. A first sum of output signals of the light receiving elements 66 1, 66-3, 66-5 is derived by an adder 71-1 and a second sum of output signals of the light receiving elements 76-2, 76-4, 76-6 is obtained by an adder 71-2. Then a difference between the first and second sums is derived by a subtracter 72-1 to produce the clock signal CK. A third sum of output signals of the light receiving elements 67-1, 67-3 and a fourth sum of output signals of the elements 67-2, 67-4 are derived by adders 71-3 and 71-4, respectively. Then, a difference between the third and fourth sums is derived by a subtracter 72-2 to generate the tracking error signal TE.

The tracking error signal TE is supplied to a tracking driver circuit 73 and the tracking servo control is effected under the control of the clock signal CK. At the same time, a fifth sum of output signals of the light receiving elements 66-1~66-6 is formed by an adder 71-5 and a sixth sum of output signals of the elements 67-1~67-4 is derived by an adder 71-6. Then, a difference between the fifth and sixth sums is derived by a subtracter 72-3 to produce the focusing error signal FE.

The focusing error signal FE is supplied to a focusing driver circuit 74 to effect the focusing servo control under the control of the clock signal CK. Of course, the data signal can be derived by processing the output signals of the light receiving elements 65-1~6516 under the control of the clock signal CK. Output signals of the light receiving elements 68-1 and 68-2 are supplied to abnormality detecting circuits 75-1 and 75-2, respectively, whose output signals are supplied to the tracking and focusing driver circuits 73 and 74, respectively.

FIG. 15 shows a situation that a defect D is existent in the clock pattern 17. When the optical card is moved in the direction A, before the defect D will enter into the region of the focusing and tracking light receiving elements 67-3, 67-4, the defect is first detected by the element 68-2. When the defect D has the higher reflectivity, the output signal of the element 68-2 becomes higher than a predetermined value which will be obtained when a normal clock pattern is detected by the element 68-2, but when the defect F has a lower reflectivity and has a larger area than the normal clock pattern, the output signal becomes lower than the predetermined value. In this connection, it should be noted that the aperture of the elements 68-1, 68-2 is made slightly larger than the image of a single clock pattern. When the optical card is moved in the opposite direction B, the defect D is first detected by the light receiving element 68-1. In the abnormality detecting circuits 65-1, 75-2, the output signals of the elements 68-1, 68-2 are compared with a threshold value corresponding to the predetermined value to identify that the defect D is existent in the clock pattern line 17. When the abnormality is detected, the focusing and tracking servo loops are locked. When the same defect D is detected by the elements 68-1 or 68-2 situating at a downstream position viewed in the moving direction of the optical card, the focusing and tracking servo loops are unlocked. In this manner, the information can be read out correctly without being influenced by the defect D in the clock pattern line 17. When light emitting elements 68-1, 68-2 are not provided, the image of defect D is received by, for example, the light receiving elements 67-3, 67-4 so that the amplitude of the focusing and tracking error signals becomes large. Then the objective lens 6 might be moved in the optical axis direction to a large extent and the light spot might deviate from the track, so that the information could not be read out correctly. On the contrary, in the present embodiment, the defect D is detected by the light emitting elements 68-1, 68-2 provided outside the focusing and tracking error detecting region and the focusing and tracking servo controls are locked, so that the information can always be read out accurately.

Figure 16B:
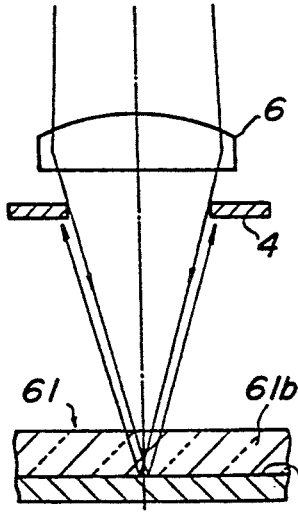
Figure 16C:
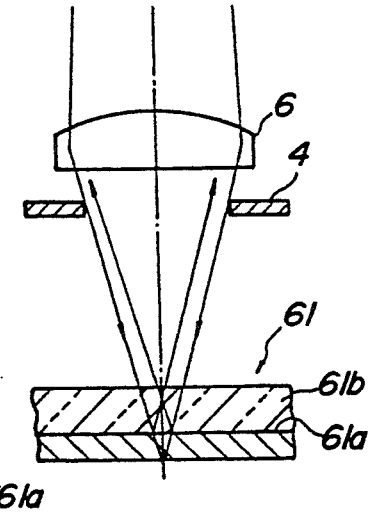

FIGS. 16A to 16C show various focus conditions. FIG. 16A illustrates the in focused condition in which the focal point of the objective lens 6 is situated on the record layer 61a. When the optical card 61 is moved downward, the size of the illuminated portion of the record layer 61a becomes smaller as illustrated in FIG. 16B, and when the optical card is moved upward, the size of the illuminated portion becomes larger as depicted in FIG. 16C. Therefore, when the apparatus is so set that the difference between the sums of elements 26-1~26-6 and 27-1~27-4, i.e. the output signal from the subtracter 72-3 in FIG. 14 becomes zero under the in-focused condition, it is possible to obtain the focusing error signal whose polarity is reversed in accordance with the upward and downward movements of the optical card with respect to the in-focused condition shown in FIG. 16A. Therefore, by effecting the focus servo control in accordance with the thus derived focusing error signal, the objective lens 6 can always be remained in the in-focused condition with respect to the record layer 61a of the optical disc 61.

Figure 17A:
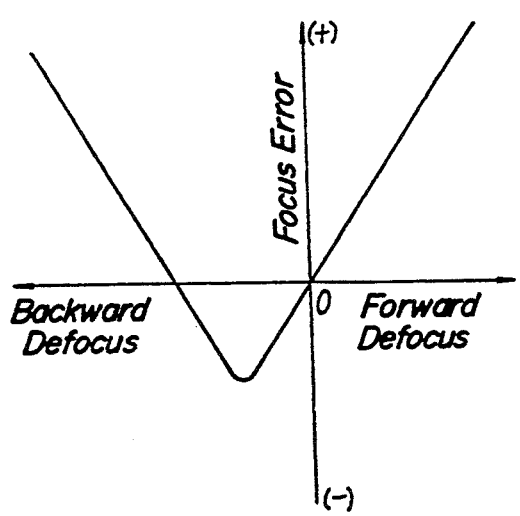
FIGS. 17A and 17B are graphs representing the focusing error signal.
Figure 17B:
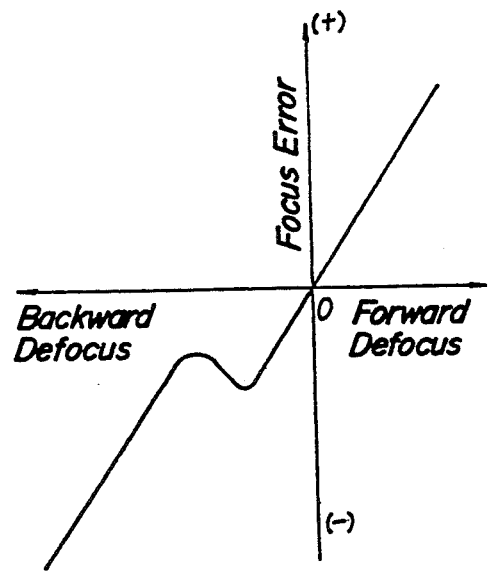

Assuming that the stop 4 is not provided, when the optical card is moved away from the objective lens 6 (backward defocus), the area of the portion on the optical card illuminated by the reading light becomes larger, and the polarity of the focusing error signal is inverted as illustrated in FIG. 17A and the objective lens 6 is driven by the focus servo control in the direction separating from the optical card and the backward defocus is enhanced. Therefore, an effective focus servo range is reduced. When the stop 4 is arranged between the objective lens 6 and the optical card 61, when the backward de-focused condition is manifested, the outer periphery light rays are shielded by the stop 4, so that the focus servo range can be increased as shown in FIG. 17B.

In the above explained embodiment, the diffusion plate 62 is provided between the laser diode 2 and the beam splitter 5, but the diffusion plate may be deleted or may be replaced by other light diffusing plate such as translucent glass plate. Further the diffusion plate may be formed in various ways as shown in FIGS. 18A to 18C. In the embodiment shown in FIG. 18A, a diffusion plate 75 has a transparent portion 75a whose contour corresponds to the region of the light receiving elements of the photodetector 63 and a light diffusing portion 75b. In the embodiment illustrated in FIG. 18B, a plate 76 has a central portion 75a having a higher transmittivity than a peripheral portion 75b. Also in this embodiment, the contour configuration of the central portion 75a corresponds to the region of the light receiving elements. In the embodiment shown in FIG. 18C, the transmittivity T of a plate 77 is continuously changed. That is to say, a central portion 77a has a higher transmittivity than a peripheral portion 77b.

Further, the stop 4 may be provided between the collimator lens 3 and the beam splitter 5, or between the beam splitter 5 and the objective lens 6 or between the beam splitter 5 and the converging lens 8. Further, the stop 4 may be deleted.

In the above embodiment, when the light receiving elements 68-1, 68-2 detect the defect in the clock pattern line, the focusing and tracking servo loops are locked. Instead of locking the servo loops, it is also possible to decrease the gain of the servo loops upon the detection of the defect. When the optical card is read only in a single direction, it is sufficient to provide only one light receiving element for detecting the defect. Further, only one of the tracking and focusing servos may be controlled by the detection of the defect.

If it is difficult or impossible to generate the clock signal from the outputs of the light receiving elements 66-1~66-6 due to the defect D, a pulse generator may be actuated in response to the detection of the defect by the abnormality detecting circuits 75-1 or 75-2 to generate a clock signal for a time period during which the defect image D passes through the photodetector 63.

FIG. 19 is a schematic view illustrating another embodiment of the optical reading apparatus according to the invention. In the present embodiment, portions similar to those shown in the previous embodiments are denoted by the same reference numerals used in the previous embodiments. In the present embodiment, the light source is constituted by a light emitting diode 81 whose light emitting point 81a is arranged to be near the collimator lens 3 with respect to the focal point 3a of the collimator lens, so that the reading light beam is projected onto the optical card 1 in the defocused condition, so that a large area on the optical card 1 can be illuminated.

FIG. 20 is a schematic plan view showing the construction of a photodetector 82 having a similar construction to that shown in FIG. 4. In the present embodiment, there are provided sixteen light receiving elements 85-1~85-16 for detecting the data, four pairs of light receiving elements 86-1~86-8 for generating the clock signal and focusing error signal, and two pairs of light receiving elements 87-1~87-4 for deriving the focusing tracking errors. The light receiving elements 87-1~87-4 are extended in the track direction such that a plurality of clock blocks in the clock pattern line are simultaneously detected.

When the optical card 1 is moved in the direction of optical axis 0 of the objective lens 6, the size of the image P of the illuminated portion of the optical card is changed. Therefore, by deriving a difference between a sum of output signals of light receiving elements 86-1~86-8 and a sum of output signals of elements 87-1, 87-2, and a difference between a sum of output signals of the elements 86-1~86-8 and a sum of output signals of elements 87-3, 87-4, two focusing error signals $FE_1$ and $FE_2$ are obtained. Similarly, when the optical card is shifted in the direction perpendicular to the track direction, the image P of the illuminated portion is also shifted in direction. Therefore, by deriving a difference between output signals from the light receiving elements 27-1 and 27-2 and a difference between output signals of the elements 87-3 and 87-4, respectively, there two tracking error signal $TE_1$ and $TE_2$ are obtained. In this manner, in the present embodiment, there are formed two focusing error detecting systems and two tracking error detecting systems with the aid of the light receiving elements 86-1~86-8 and 87-1~87-4.

FIG. 21 is a circuit diagram showing a circuit for deriving the focusing servo signal and the tracking servo signal from the above mentioned focusing and tracking error signals $FE_1$, $FE_2$, $TE_1$ and $TE_2$.

The focusing error signals $FE_1$ and $FE_2$ are suppled via switches 91-1 and 91-2, respectively, to an adder 92-1 whose output signal is supplied to an attenuator 93 to derive a focus servo signal FS. The tracking error signals $TE_1$ and $TE_2$ are suppled via switches 91-3 and 91-4, respectively, to an adder 92-2 to derive a tracking servo signal TS.

The focusing error signals $FE_1$ and $FE_2$ are further supplied to a subtracter 94 to derive a difference therebetween and also to absolute value circuits 95-1 and 95-2. In the absolute value circuits 95-1, 95-2, absolute values of differences between the focusing error signals $FE_1$ and $FE_2$ and a reference level are detected. The output signal of the subtracter 94 is supplied to one input terminals of comparators 96-1 and 96-2. To the other input terminals of the comparators 96-1, 96-2 are applied reference voltages $+E$ and $-E$, respectively from reference voltage sources 97-1 and 97-2, respectively. The output signal of the subtracter 94 is compared with the reference voltages $+E$, $-E$, and when the output signal exceeds $+E$ or is lower than $-E$, an OR gate 98 generates an output signal of a logic high level (H). In this manner, the comparators 96-1, 96-2 and OR gate 98 form a so-called window comparator. The output signal of the OR gate 98 is supplied via diode 99, resistor 100 and capacitor 101 to a buffer 102 of the Schmitt input. Then, the buffer 102 supplies a control signal $G_3$ to the attenuator 93, said control signal being extended or prolonged by a time constant determined by a resistance value Rd of the resistor 100 and a capacitance value Cd of the capacitor 101 only when the output of the OR gate 98 is in the high level. Then, the output of the adder 92-1 is attenuated in the attenuator 93. When the output of the buffer 102 is in the low level (L), the attenuator 93 does not attenuate the signal, and the output of the adder 92-1 is supplied as the focus servo signal FS. The output signals of the absolute value circuits 95-1, 95-2 are compared with each other in a comparator 96-3. The output signal of the comparator 96-3 is supplied to one input of NAND gate 103-1 directly as well as to one input of NAND gate 103-2 via an inverter 104. To the other inputs of the NAND gates 103-1, 103-2 is supplied the output signal of the OR gate 98. The NAND gate 103-1 generates a control signal $G_1$ which controls the switches 91-1 and 91-3 in such a manner that only when the output of the NAND gate 103-1 is in H level, the switches 91-1 and 91-3 are made on. The NAND gate 103-2 produces a control signal $G_2$ which serves to control the switches 91-2 and 91-4. When the control signal $G_2$ is in the H level, the switches 91-2, 91-4 are made on, but when the control signal $G_2$ has the L level, these switches are made off.

When there is no defect in the clock pattern line 17 on the optical card 1, the focusing error signals $FE_1$ and $FE_2$ have substantially the same amplitude and the output of the subtracter 93 is in a range from $-E$ to $+E$. Therefore, the output of the OR gate 98 is in the L level, SO that the control signals $G_1$ and $G_2$ are in the H level in regardless of the output of the comparator 96-3, and thus all the switches 91-1~91-4 are made on. Further, when the control signal $G_3$ is in the L level, the attenuator 93 does not effect the attenuation and the output signal of the adder 92-1 is passed through the attenuator without being attenuated. Therefore, the focusing servo signal FS becomes a sum of the focusing error signals $FE_1$ and $FE_2$ and the tracking servo signal TS becomes a sum of the tracking error signals $TE_1$ and $TE_2$.

When the clock pattern 17 has the defect, the image of defect D is moved in the track direction with respect to the photodetector 82 as shown in FIGS. 22A~22E. In these figures, the light receiving elements 85-1~85-16 are omitted for the sake of simplicity. As shown in FIGS. 22A~22E, as long as defect D is not so large, the defect could hardly affect the focusing error signals $FE_1$ and $FE_2$ simultaneously, and therefore the output of the subtracter 94 is increased or decreased. When the output of the subtracter 94 becomes out of the range of $-E \sim +E$, the output of the OR gate 98 is changed into the H level. This high level output of the OR gate 98 is supplied to the buffer 102 via the diode 99 and the control signal $G_3$ becomes high level, so that the attenuator 93 effects the attenuation. Now, it is assumed that the defect D affects the focusing error signal $FE_2$, the output of the absolute value detecting circuit 95-2 becomes larger than that of the circuit 95-1, so that the output of the comparator 96-3 becomes low level. Therefore, the control signals $G_1$ and $G_2$ become H and L levels, respectively, and the switches 91-1, 91-3 are made on, but the switches 91-2, 91-4 are made off. Then, the focusing error signal $FE_2$ and tracking error signal $TE_2$ are cut, and the focus servo signal FS is formed by the focusing error signal $FE_1$ attenuated by the attenuator 93 and the tracking servo signal TS is constituted solely by the tracking error signal $TE_1$. When the defect D has the influence upon the focusing error signal $FE_1$, the output of the comparator 96-3 becomes high level, so that the control signals $G_1$ and $G_2$ become low and high levels, respectively. Therefore, the switches 91-1, 91-3 are made off and the switches 91-2, 91-4 are made on. Then, the focusing and tracking error signals $FE_1$ and $TE_1$ are cut off, and the tracking servo signal TS is formed by the tracking error signal $TE_2$ and the focusing servo signal FS is made by the focusing error signal $FE_2$ attenuated by the attenuator 93.

As illustrated in FIG. 22C, when the defect D situates at the region of the light receiving elements 86-1~86-8, focusing error signals $FE_1$ and $FE_2$ are influenced by the defect to the substantially same extent, so that the output of the OR gate 98 becomes low and all the switches 91-1~91-4 are made on. However, before the defects D comes into the region of the elements 86-1~86-8, the defect is detected by the elements 87-3, 87-4 or 87-1, 87-2 depending upon the direction of the movement of the optical card. At that time, the difference between the focusing error signals $FE_1$ and $FE_2$ becomes large and the output of the OR gate 98 becomes high. This output signal of high level is delayed by the delaying function of the resistor 100 and capacitor 101, so that the output of the buffer 102, i.e. the control signal $G_3$ is remained high for a predetermined period which is set to be a loner than a time period during which the defect affects the elements 86-1~86-8. In this manner, even when both the focusing error signals $FE_1$ and $FE_2$ are simultaneously influenced by the defect, the influence can be mitigated and the servo control can be effected accurately.

FIGS. 23 and 24 show the variation of the various signals appearing at various points in the circuit shown in FIG. 21 at various timings A~E which correspond to the situations shown in FIGS. 22A~22E, respectively.

In the embodiments so far explained, the focusing error signal is detected by utilizing the fact that the size of image of the light beam projected upon the photodetector is changed in accordance with the de-focused condition. According to the invention, the focusing error can be detected by a different means. For instance, the focusing error signal may be derived by utilizing the fact that the light beam includes a circular or elliptical ring portion at which the luminous intensity is not changed in regardless of the focus condition. In FIG. 20, the above explained ring portion is represented by a dotted circle Q. Then, the focusing error signal may be obtained by deriving a difference between a sum of output signals of light receiving elements 86-1~86-8 and a sum of output signals of light receiving elements 87-1~87-4. In this manner, the focus condition can be detected accurately with a high sensitivity in the differential manner.

As explained above in detail, in the present embodiment, even if one of the focusing error signals $FE_1$ and $FE_2$ or one of the focusing error signals $TE_1$ and $TE_2$ is affected by the defect D in the clock pattern line on the optical card, the other focusing or tracking error signal is exclusively used to derive the focusing or tracking servo signal, so that the information can always be read out correctly.

What is claimed is:

1. An apparatus for reading information from an optical record medium in which information is recorded along one or more tracks comprising:
    a light source having a light emitting point;
    a collimator lens positioned to receive a light beam from said light emitting point, said collimator lens having an optical axis on which lies said light emitting point of the light source, wherein said light emitting point is not at the focal point of the collimator lens thereby producing a slightly converted or diverged light beam;
    a beam splitter positioned to receive said light beam from the collimator lens, said beam splitter having a beam splitting surface which serves to transmit and reflect light beams;
    an objective lens positioned to receive said light beam from said beam splitter thereby converging said light beam, said objective lens projecting said light beam onto an optical record medium and directing a light flux reflected from such an optical record medium to said beam splitter;
    a converging lens positioned to receive said light flux after being reflected from said beam splitter thereby converging said light flux; and
    a photodetector positioned to receive said light flux from said converging lens to derive a signal representing the information recorded on an optical record medium.

2. An apparatus according to claim 1, wherein said light source and collimator lens are arranged such that the light flux reflected by a record layer of the optical record medium is focused at a point substantially at a middle point of a transparent layer applied on the record layer.

3. An apparatus according to claim 1 wherein said photodetector comprises:
    a data track reading region including at least one light receiving element for receiving an image of a data track on the optical record medium;
    a control track reading region including at least one pair of light receiving elements for receiving an image of a control track formed on the optical record medium in parallel with the data track; and
    a signal processing circuit for receiving output signals from the data reading region to produce a data signal representing data recorded in the data track, and for receiving output signals form the control track reading region to produce a focusing error signal representing a deviation of a distance between the objective lens and the optical record medium for effecting a focusing servo control, and a tracking error signal representing a deviation of the light beam impinging upon the optical record medium and the data track in a track width direction substantially perpendicular to the track direction in which the data track extends for effecting a tracking servo control.

4. An apparatus according to claim 3, wherein said data reading region of the photodetector includes a plurality of light receiving elements arranged in the track width direction.

5. An apparatus according to claim 3, wherein said control track reading region of the photodetector comprises a first set of at least one pair of light receiving elements which are arranged in the track direction equidistantly and a second set of at least one pair of light receiving elements which are separated from each other in the track width direction.

6. An apparatus according to claim 5, wherein said focusing error signal is generated by deriving a difference between a sum of output signals of said first set of light receiving elements and a sum of output signals of said second set of light receiving elements.

7. An apparatus according to claim 6, wherein said control track reading region further comprises a third set of at least one light receiving element arranged outside the first and second sets of light receiving elements, and said signal processing circuit comprises means for processing a signal generated by said third set of at least one light receiving element to detect an abnormality which represents a defect in the control track, and upon detection of the abnormality, for locking the focusing and tracking servo controls.

8. An apparatus according to claim 6, wherein said control track reading region further comprises a third set of at least one light receiving element arranged outside of the first and second sets of light receiving elements, and said signal processing circuit comprising means for processing a signal generated by said third set of at least one light receiving element to detect an abnormality which represents a defect in the control track, and upon detection of an abnormality, for decreasing gains of the focusing and tracking servo controls.

9. An apparatus according to claim 5, wherein said each of first and second sets of light receiving elements comprises a plurality of light receiving element pairs to generate a plurality of focusing error signals and a plurality of tracking error signals, and said signal processing circuit is constructed such that one of the focusing error signals and one of the tracking error signals are selected in accordance with said plurality of focusing and tracking error signals.

10. An apparatus according to claim 9, wherein said signal processing circuit is constructed such that absolute values of said plurality of focusing error signals are compared with each other, and the focusing error signal having the smallest absolute value is selected.

11. An apparatus according to claim 9, wherein said signal processing circuit is constructed such that when any abnormality is detected, the focusing and tracking servo controls remain in a given state for a time period during which the abnormality is detected.

* * * * *